US008855839B2

(12) United States Patent
Frazier et al.

(10) Patent No.: US 8,855,839 B2
(45) Date of Patent: Oct. 7, 2014

(54) FUEL TANK ASSEMBLY AND METHOD OF USE

(71) Applicant: Bright Energy Storage Technologies, LLP, Arvada, CO (US)

(72) Inventors: Scott Raymond Frazier, Morrison, CO (US); Kevin Pykkonen, Boulder, CO (US); Karl Ginter, Beltsville, MD (US); Jeffrey Orion Pritchard, Oakland, CA (US)

(73) Assignee: Bright Energy Storage Technologies, LLP, Arvada, CO (US)

( * ) Notice: Subject to any disclaimer, the term of this patent is extended or adjusted under 35 U.S.C. 154(b) by 0 days.

(21) Appl. No.: 13/839,615

(22) Filed: Mar. 15, 2013

(65) Prior Publication Data
US 2013/0245864 A1 Sep. 19, 2013

Related U.S. Application Data

(60) Provisional application No. 61/611,530, filed on Mar. 15, 2012.

(51) Int. Cl.
*B61C 17/02* (2006.01)
*G06F 19/00* (2011.01)

(52) U.S. Cl.
USPC .............................. 701/16; 701/36; 105/29.1

(58) Field of Classification Search
CPC .......... B61C 5/00; B61C 17/00; B61C 17/02; B61C 3/00; B60L 2200/26; F02M 25/07; Y02T 30/16; Y02T 90/32; Y02T 90/34; Y02T 90/40

USPC ....... 701/19, 1, 36; 290/1 R, 4 R; 105/35, 27, 105/62.1; 246/186
See application file for complete search history.

(56) References Cited

U.S. PATENT DOCUMENTS

| | | | |
|---|---|---|---|
| 3,766,734 A | 10/1973 | Jones | |
| 5,907,193 A | 5/1999 | Lumbis | |
| 5,950,967 A | 9/1999 | Montgomery | |
| 6,267,062 B1 * | 7/2001 | Hamilton, Jr. | 105/26.05 |
| 6,408,766 B1 | 6/2002 | McLaughlin et al. | |
| 6,520,124 B2 * | 2/2003 | Bohm, II | 123/2 |
| 6,591,758 B2 | 7/2003 | Kumar | |
| 6,877,581 B2 * | 4/2005 | Badr et al. | 180/311 |
| 6,937,925 B2 | 8/2005 | Smith | |
| 6,973,880 B2 | 12/2005 | Kumar | |
| 7,021,588 B2 | 4/2006 | Hess, Jr. et al. | |
| 7,021,589 B2 | 4/2006 | Hess, Jr. et al. | |
| 7,284,575 B2 | 10/2007 | Gram et al. | |
| 7,304,445 B2 | 12/2007 | Donnelly | |
| 7,627,416 B2 | 12/2009 | Batenburg et al. | |
| 7,971,538 B1 * | 7/2011 | Miller et al. | 105/50 |
| 8,294,285 B2 * | 10/2012 | Hunter | 290/1 R |
| 2002/0174798 A1 | 11/2002 | Kumar | |
| 2002/0189564 A1 | 12/2002 | Biess et al. | |

(Continued)

*Primary Examiner* — Tan Q Nguyen
(74) *Attorney, Agent, or Firm* — Ziolkowski Patent Solutions Group, SC

(57) ABSTRACT

A fuel assembly and a method of providing fuel is disclosed. The fuel assembly includes a frame, a first fuel storage tank sized to fit within the frame and configured to store one of a liquid and a gaseous fuel, and a fuel control assembly configured to regulate delivery of the gaseous fuel to an external power unit. The fuel control assembly includes a first fuel assembly memory module having stored thereon identifying information of the interchangeable fuel assembly.

23 Claims, 8 Drawing Sheets

(56) References Cited

U.S. PATENT DOCUMENTS

| | | | |
|---|---|---|---|
| 2004/0099256 A1* | 5/2004 | Stewart | 123/568.11 |
| 2006/0061307 A1 | 3/2006 | Donnelly | |
| 2006/0102397 A1* | 5/2006 | Buck et al. | 180/65.3 |
| 2006/0138285 A1* | 6/2006 | Oleski et al. | 246/167 R |
| 2008/0121136 A1 | 5/2008 | Mari et al. | |
| 2008/0148993 A1* | 6/2008 | Mack | 105/35 |
| 2008/0223250 A1 | 9/2008 | Bachman | |
| 2009/0293759 A1 | 12/2009 | Schmitz | |
| 2010/0148581 A1 | 6/2010 | Gupta et al. | |
| 2010/0212539 A1 | 8/2010 | Iden | |
| 2013/0173143 A1 | 7/2013 | Biagini | |

* cited by examiner

FUEL TANK ASSEMBLY AND METHOD OF USE

CROSS REFERENCE TO RELATED APPLICATION

The present invention is a continuation of and claims priority of U.S. Provisional Patent Application Ser. No. 61/611,530 filed Mar. 15, 2012, the disclosure of which is incorporated herein by reference.

BACKGROUND OF THE INVENTION

Embodiments of the invention relate generally to gaseous fuel assemblies and, more particularly, to a method and apparatus for providing a gaseous fuel for a power source.

Traditional railroad locomotives are powered by diesel-electric power sources, where a diesel engine drives a generator to produce electric power. The output power produced by these engine-generator sets is in turn used to power one or more electric traction motors. The traction motors power the drive wheels of the locomotive.

Locomotives are, by nature, self-contained in that they generate and use the power they require. Typically, locomotive limits are defined by the equipment and fuel that can be carried on the locomotive chassis. Attempts have been made to extend locomotive limits by, for example, attaching a tank car containing fuel (or water) behind a locomotive to give it extended operating range. However, these approaches are of limited utility and are generally not practiced due to harsh operating conditions that limit the ability to distribute locomotive functions across disparate chassis as well as the technical challenges of integrating stock railroad equipment with locomotives.

In recent years, as power needs have grown and railroads have become more concerned about emissions and fuel costs, a variety of approaches have been tried to improve the efficiency of locomotive power.

One such approach is a genset diesel locomotive, which includes a computer-controlled system that manages multiple smaller diesel engines that are turned on and off as power requirements of the railroad locomotive varies.

FIG. 1 illustrates a schematic of an exemplary prior art genset diesel locomotive 10 that includes a locomotive controller 12 that manages multiple engines and additional sensors and inputs. Genset diesel locomotive 10 includes a first engine-generator set 14 and a second engine-generator set 16, both operating in response to locomotive controller 12. Each engine-generator set 14, 16 includes an engine 18, 20 connected to a respective generator 22, 24, which produce electricity for the locomotive traction bus 26 and an auxiliary power bus (not shown). Generators 22, 24 are configured to convert the mechanical energy provided by engines 18, 20 into a form acceptable to one or more traction motors 28 (DC or AC type) configured to drive the axles coupled to the driving wheels 30 of the locomotive 10, and to provide DC or AC power to the respective auxiliary power bus. The amount of power produced by each generator 22, 24 is determined by the engine RPMs and the generator excitation control inputs that are received by generators 22, 24 from locomotive controller 12.

The computer-controlled system for a typical genset diesel locomotive includes an analog electro-mechanical locomotive controller 12 with a throttle control electro-mechanically linked to the controller 12. The controller 12 controls the amount of power generated by the engine-generator sets 14, 16 by varying engine speed and generator excitement in order to produce the desired amount of power on the traction bus 26. In some of these control systems, additional power sensors (not shown), such as load regulators, are used to monitor the fraction bus 26 and/or one or more traction motors 28 and provide input to the controller 12 so it may more accurately manage the engine-generator sets 14, 16. Specifically, the control system uses these sensors for feedback to further govern control of the amount of power generated by the engine-generator sets 14, 16.

Locomotive 10 also includes an engine start and stop control 32 which interfaces with the locomotive controller 12 and is linked to engine-generator sets 14, 16 to initiate their operation and to terminate their operation.

Locomotive 10 also includes engine sensors 34, 36 electrically coupled to engines 18, 20 and the locomotive controller 12. Engine sensors 34, 36 transmit signals 38 to the locomotive controller 12 regarding the status and/or operation of each of the engines 18, 20 (e.g., various parameters of the engines 18, 20 such as RPMs, operating power output, temperature, and other engine status or operating parameters). Locomotive controller 12 transmits control signals 40, including engine RPM settings, generator excitation control inputs, etc., to engine-generator sets 14, 16 to control operation thereof.

In some implementations, engines 18, 20 are operated in response to a throttle position input sensor 42 which indicates the position of the throttle as controlled by the operator at an operator interface 44. In addition, an operator engine start input 46 may be included where the operator can directly or indirectly instruct the locomotive controller 12 (e.g., via a keypad (not shown) located on operator interface 44) with regard to initiation of operation of the engines 18, 20 or termination of operation of the engines 18, 20.

The second to second operation of a locomotive is managed by locomotive controllers. In general, there are two types of locomotive controllers, "traditional" controllers that recognize and control a single engine-generator combination installed on the locomotive chassis, and "genset" controllers, which control a plurality of engine-generator combinations installed on a locomotive chassis. These locomotive controllers manage the production of electricity, provision of the electricity to the power bus, and the generation of tractive effort by traction motors that use the provided electricity. These locomotive controllers also manage fuel use and efficiency, emissions production, and other aspects of the locomotive operation.

In each of these cases, the locomotive controller manages a static, predefined arrangement of one or more engine/generators that provide power to a bus, which in turn provides power to traction motors that move the locomotive. Some locomotive controllers have been configured to control static arrangements of dissimilar power sources (such as an engine-generator, fuel cell, gas turbine, or batteries). These static arrangements have failed due to the lack of operational flexibility required for day-to-day operation of locomotives and/or operational limitations (such as locomotive range, power production limitations, and requiring support for multiple fuel sources). In particular, "genset" style locomotive controllers have not found use in line haul applications because they produce lower overall power than a single, large engine. The amount of power available to the traction motors is a key operational component that characterizes line haul locomotives. Use of dissimilar power source arrangements have failed due cost and operational issues.

Known locomotive controllers also fail to address unexpected signals and operational challenges that become evident when extending the locomotive control and power systems between disparate railcar chassis and integrating power from these external sources with power produced by the engine/generator(s) on the locomotive chassis. As a result, many locomotive power tender configurations have been tried and abandoned due to a number of operational, safety, and related technical issues.

Operational and safety concerns of extended locomotive control and power systems are many and varied. First, locomotive controllers and power tenders may be some distance apart, particularly in consists in which multiple power tenders are utilized. Each rail car is approximately 100 feet in length, and signal degradation, electro-magnetic interference, propagation delays, and related issues are factors when operating a power tender and locomotive together.

Second, extending the power bus (sometimes called a fraction bus) between railcars presents similar concerns, not with the signal degradation, but with the cabling and switching apparatus used to safely transport high amperage currents (e.g., 2000 amps) between the power tender and the locomotive fraction bus. Power losses, in particular, voltage losses, arcing, and related issues come into play. Since locomotive power blending is governed by the voltage of the provided power, and is characterized by tight control of the voltage provided to the power bus, losses in voltage or current between a power tender and the locomotive will cause the locomotive controller to improperly manage the combined locomotive/tender. In some cases, these losses will cause the locomotive to not operate. Switching of high amperage power requires Specialty circuitry is also need when switching high amperage power to prevent arcing, contact welding, voltage and amperage spikes and drops, etc.

Third, locomotives and attached power tenders operate in harsh environments. These environments include physical and electro-magnetic challenges. The physical challenges are many and varied; they include widely varied operating temperatures, weather, poor electrical connections between the locomotive and the tender, etc. The control and sensor data is subject to intense electro-magnetic environments (that disrupts the control and sensor data) both external to the consist and within the infrastructure. The shielding required to mitigate these issues described above is itself susceptible to the physical challenges, and degrades over time. Operating a locomotive/power tender in these conditions is challenging.

Fourth, locomotives and their attached power tenders may encounter operational issues, such as connector failure, cable separation, or even chassis separation during regular operation (for example, as would be caused by a coupler failure). Both the locomotive and the attached power tender must safely operate when these conditions occur.

To understand these issues, one must consider both physical and logical constraints of current locomotive consists and locomotive controller architecture.

Railroads have operated many configurations of locomotives and power tenders over the years. Traditionally, locomotive arrangements (herein called a "consist") include multiple locomotives, linked together using multiple-unit ("MU") controls. A locomotive consist is the arrangement of locomotives, slugs, and power tenders which are coupled together to provide motive power to a train. One common arrangement is the coupling of two or more independent locomotives together and operating them as a single unit. This arrangement of locomotives has an independent locomotive controller for each locomotive chassis, and shares only throttle setting (an input to a locomotive controller), brake settings, and fault indications. These throttle settings, brake settings, and fault indications are communicated using combination electrical and pneumatic connection commonly referred to "multiple unit" ("MU").

MU locomotive arrangements are the current operating paradigm for most railroads today. MU locomotives arrangements are characterized by each locomotive having its own independent power generation, distribution (bus), and traction motors. MU controls relay throttle and brake instructions from a first locomotive (master or "A" units) to one or more second locomotives (slaves or "B" units), where these instructions are independently interpreted and tractive effort is provided independently by each locomotive in the consist.

MU locomotives operate independently and do not share power or engine control signals, nor do they permit a first locomotive controller to make requests of a second locomotive controller. Similarly, the locomotive controllers of locomotives operating in MU fashion do not share operational data and do not make operational decisions about the operations of a first locomotive controller based upon the operational characteristics of the second locomotive controller.

Locomotive controllers can be generally characterized as outputting engine control voltages (e.g., RPM and generator excitement voltages), receiving sensor input of operational information (e.g., actual RPM, some fault information, and, in some cases, power bus sensor readings), and then acting to adjust the operation of the engine by varying its control voltages. Locomotive controllers manage the locomotives engines and provide power blending by controlling the amount of power and voltage provided by each engine to the common power bus, which permits the provided power to be combined on the power bus.

Known locomotive controllers are constructed with a basic assumption that the power sources that they control are provided in a fixed arrangement. If a locomotive controller is unaware of multiple possible power sources (e.g., a traditional controller described above), then the use of an external power tender can only be provided on an "all or nothing" basis, where the power tender directly substitutes for the engine-generator on the locomotive chassis. Given the complex nature of locomotive control and the interrelatedness of locomotive loads such as traction motors and blowers, a locomotive's controller, its engine-generator, and an external power tender cannot "share" the generation requirement, with a portion of the power coming from the engine-generator, and remainder of the power coming from the external power tender without the locomotive controller being aware of the power tender and the amount of power it produces. The locomotive controller will recognize the additional power available on the bus and either fault, mis-control one or more power sources or loads, or even turn off the locomotive's engine-generator. Since other locomotive systems are often tied to the locomotive engine-generator or are utilized proportionally to the amount of power being used by locomotives loads (e.g., blowers, aux power), this results in a non-functioning locomotive.

Specialty locomotive controllers that are aware of multiple power sources also have challenges operating with external power tenders. First, the locomotive controller must be able to handle "power blending," simultaneously taking part of the required power from a first power source and taking a second part of the required power from a second power source. Specialty controllers that select between one power source or another have the same operational challenges as a traditional locomotive controller (described above). Also, specialty controllers have the operational constraints of each specialty power source hard-coded into their logic and electronics, making changes to the power source configuration hard to impossible.

"Genset" style locomotive controllers are characterized in that they are designed to control multiple engine-generators and to "blend" the power produced by these generators. "Genset" style locomotive controllers typically operate in the DC realm, where they set the power sources to produce differing power amounts at differing voltages, as the blending of power on a common bus is based upon voltage differentials between the power bus and the various power sources (e.g., onboard engine-generators, power tenders). As voltage on the bus drops under load, additional power flows from power sources providing power at voltages about the power bus voltage. Thus, tight voltage control must be used to operate correctly.

Each diesel engine-generator combination is controlled with one set of operational parameters and is controlled by varying run RPM and alternator excitement. Even when engines are placed on disparate railcar chassis, a genset locomotive controller expects that the power tender provides a static, well-known power source that behaves as if it were present on the locomotive chassis. Genset locomotive controllers do not account for the operational issues described above, which lead to no-power, under-power (power not flowing from the power tender to the locomotive power bus), or even whether the power tender is currently attached as part of the consist.

Additionally, genset controllers have built-in assumptions regarding the power curve and engine settings (e.g., RPM, generator excitement) that are used to produce specific power / voltages. These operating assumptions are violated by physical limitations induced by separating the power tender from the locomotive chassis (as described above), and by logical considerations that power tenders may have differ operating parameters and settings (e.g., differing engine type, characteristics, fuels). In current configurations, power tenders and locomotive controllers must be operated as a single, non-varying consist because of inherent limitations in the locomotive control and the lack of locomotive controller knowledge of differing power tenders and each power tenders instructions and operational characteristics.

Newer locomotive power control systems have evolved from electro-mechanical to digital controls offering a variety of new options for power control that perform the same functions as the older electro-mechanical control systems, as well as add new power management and train control functions in order to improve performance and fuel efficiency. However, retrofitting these digital controllers to pre-existing (legacy) locomotives is problematic.

The cost and technical integration challenges of replacing an existing locomotive control system of these older legacy locomotives with a new generation control system are prohibitive. Generally, this requires the wholesale replacement of the locomotive control system and many of the locomotive controls, as well as substantial modifications to the locomotive engine, generator, and other electrical components on the locomotive. Furthermore, these types of changes typically cause a reclassification of the locomotive and require recertification of the locomotive power plant for safety and emissions. The recertification process requires that the engine emissions be updated to current EPA requirements, which adds additional cost. Combined, these costs are prohibitive.

In response to rising fuel costs and tightening emissions controls, attempts have been made to provide alternative power sources for genset diesel locomotives, including replacing the diesel fuel and engine with hydrogen and natural gas powered engines, fuel cells, batteries, and other mechanisms for generating and storing power. While in theory these alternative fuels are capable of producing traction power at a fraction of the cost of a diesel locomotive engine/generator, the use of these alternative power sources pose several challenges for the locomotive industry.

For example, outfitting railroad locomotives with alternative fuel technology incurs expensive infrastructure costs and fueling times. Gaseous fuels, such as hydrogen and natural gas, provide limited range, have limited stored energy, have long refueling times, and require extensive alternative fueling infrastructures. While attempts have been made to add alternative power sources and fuel sources to the locomotive consist, the power and fuel sources are provided in heavy rail containers that require large, container-handling cranes in a rail yard in order to lift containers that house engines and their alternative fuel sources, thereby limiting refueling of alternative fuel locomotives to rail yard locations that support the alternative fuel infrastructure. Further, expensive, rail yard based infrastructure, such as extensive cascades of pressurized tanks are needed to refuel a single set of locomotive tanks These expensive rail yard infrastructures make the use of these existing technologies untenable. Still further, many alternative locomotive power approaches add substantial amounts of time to refueling and other maintenance operations. For example, the time required to refuel a set of tanks of natural gas is measured in hours, where the time required for fueling a diesel locomotive is closer to fifteen minutes. Fueling times further restrict alternative fuel uses to yard applications such as switchers where the alternative fuel equipment has substantial time available for recharging.

Existing systems also do not recognize the fundamental cost improvement for railroad locomotives that is available is based upon the cost of fuel relative to the amount of energy that is produced by using that fuel, and that other optimizations often are minor in comparison. These systems also fail to recognize that different fuels have different energy content, and that these fuels have different costs depending upon where they are obtained. For example, diesel fuel typically costs more in California than it does on the Gulf Coast, and depending upon market conditions, it may be more efficient to use natural gas, syngas, process gas, diesel, or some other fuel to produce the power required for railroad locomotive use. For these and other reasons, alternative fuel-based power for railroad locomotives has not been accepted by the industry.

Further, retrofitting pre-existing (legacy) locomotive engine controllers for use with alternative fuels is generally cost prohibitive and bring concerns about reliability in these retrofit applications. Current railroad locomotive inventories include many thousands of older locomotives, such as the EMD SD-40 family. The control systems integrated into these pre-existing legacy locomotives typically employ a single engine/generator combination that is controlled with electro-mechanical or simple electronic control systems. The lack of flexibility of these older control systems prohibits the use of newer, more desirable, power sources capable of operating with alternative fuel sources.

In light of the above, it would be advantageous to maintain the ability to operate an existing locomotive engine using the fuel for which it was originally designed while adding the ability provide extra power to that locomotive from an auxiliary power source. Such an approach would allow full redundancy of power generation from more than one fuel and engine/generator, and may in certain situations, allow a controller to provide power to the wheels of more than 100% of the locomotive engine/generator set originally paired with the drive motors.

In light of the above, it would be desirable to design an apparatus and method for providing an auxiliary power source for a locomotive that can be integrated with existing electro-mechanical locomotive controls to provide the benefits of being able to incorporate power from alternative fuel sources with a minimum of rework or recertification of the locomotive power plant or other locomotive systems, such as fans, air conditioning, or additional sensors.

It would further be desirable to design an apparatus and method for refueling a locomotive that permits the use of alternative fuels in easy to use interchangeable delivery systems, where alternatives, such as currently available gaseous fuels, can be provided to railroad locomotives without incurring expensive infrastructure costs and fueling times.

It would also be desirable to design a railroad locomotive that optimizes power usage based upon the costs of available fuel and power requirements, permitting fuel- and power-cost arbitrage within the locomotive and substantially reducing the costs of operating the locomotive.

BRIEF DESCRIPTION OF THE INVENTION

Embodiments of the invention overcome the aforementioned drawbacks by providing for the use of alternative fuel-based power for railroad locomotives, enable the use of situationally available fuels to power railroad locomotives, and permit railroad locomotives to make cost-advantaged use of alternative power when it is cost effective to do so.

In accordance with one aspect of the invention, a fuel assembly for a train engine includes a frame, a first fuel storage tank sized to fit within the frame and configured to store one of a liquid and a gaseous fuel, and a fuel control assembly configured to regulate delivery of the gaseous fuel to an external power unit. The fuel control assembly includes a first fuel assembly memory module having stored thereon identifying information of the interchangeable fuel assembly.

In accordance with another aspect of the invention, a rail car assembly includes a power unit configured to supply an auxiliary power to a locomotive and an interchangeable fuel assembly coupled to the power unit. The interchangeable fuel assembly includes a support frame, a storage tank disposed within the frame, the storage tank having fuel contained therein, and an electronic control system configured to monitor operating characteristics of a fuel stored within the storage tank. The electronic control system includes an electronic memory module having stored thereon identifying information for the interchangeable fuel assembly.

In accordance with yet another aspect of the invention, a method of providing fuel for a locomotive assembly includes providing a first interchangeable fuel assembly. The first interchangeable fuel assembly includes a first fuel tank disposed within a frame, the first fuel tank constructed to store a first gaseous fuel and a first fuel control system that includes a first memory module having stored thereon identifying information for the first fuel tank. The identifying information includes at least one of a fuel type and a fuel cost of the first gaseous fuel. The method also includes fluidly coupling the first interchangeable fuel assembly to a power unit and relaying the identifying information for the first gaseous fuel tank to the power unit.

These and other advantages and features will be more readily understood from the following detailed description of preferred embodiments of the invention that is provided in connection with the accompanying drawings.

BRIEF DESCRIPTION OF THE DRAWINGS

The drawings illustrate preferred embodiments presently contemplated for carrying out the invention.

In the drawings.

DETAILED DESCRIPTION

Figure 1:
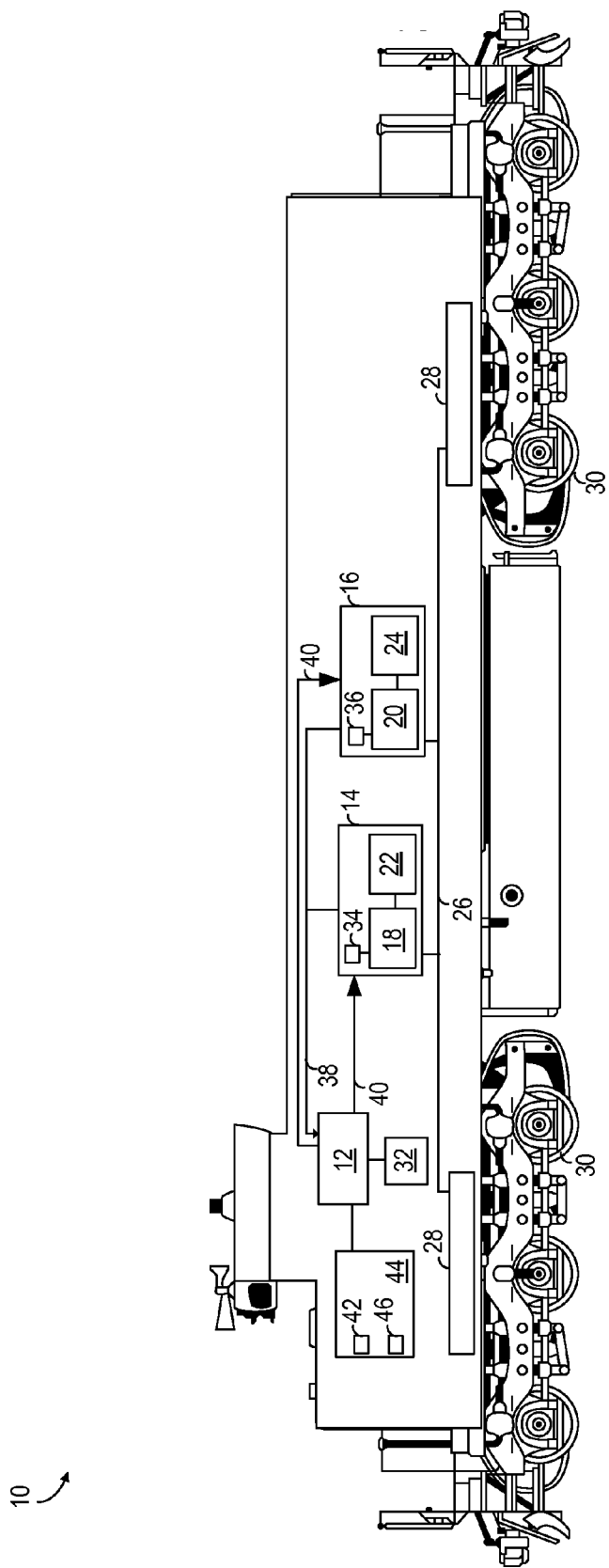
FIG. 1 is a schematic diagram of an exemplary prior art diesel genset locomotive.

Auxiliary power arrangements set forth herein permit the provision of additional power to a locomotive over the amount of power that can be produced by the engine/generator combination(s) that are part of the diesel locomotive. In some operational situations, such as when the locomotive consist is running at higher speeds, the pulling capacity of the locomotive is limited by the amount of power that can be provided by the locomotives to their traction motors. The use auxiliary power permits the locomotive to move the train to greater speeds.

Embodiments of the described systems and methods also support the concept of power arbitrage between differently fueled locomotive power sources, where the arbitrage is made based upon cost of fuel or the cost of delivered power vs. the power needs of locomotive traction and auxiliary loads.

Still further, embodiments of the described systems and methods enable a metering-based power delivery approach, where the locomotive power use from alternative fuel power sources is metered and may be separately invoiced or billed to the railroad or locomotive operator. While the systems and methods of use set forth herein are described as being used in connection with the locomotive industry, one skilled in the art will recognize that the benefits of the fuel assembly, rail car assembly, and method for providing fuel are equally applicable to any number of alternative industrial applications in which a fuel tank is coupled to an engine, such as, for example, in the trucking industry or the maritime industry.

One key aspect when using alternative fuel types in a power tender is the differential in fuel cost, or ultimately, the cost of a unit of power provided to a power bus. The locomotive controllers set forth herein are able to arbitrage fuel and power costs between the locomotive's power sources and auxiliary power units provided in a power tender to more efficiently operate. Further, the locomotive controllers and auxiliary power units set forth herein are able to communicate additional information (such as its ID, control input description, control settings/emissions, control setting/generated power graphs, fuel type, power cost) about the control and operation of the auxiliary power unit to the locomotive controller. Absent at least some of this information, the locomotive controller would be unable to effectively control the auxiliary power units.

A locomotive consist is defined for purposes herein as an arrangement of locomotives and auxiliary power units, coupled together, which share control and power connections between at least one locomotive and at least one auxiliary power unit. For purposes of illustration, several exemplary configurations of consists may be defined as follows:

A-B Consist: One locomotive coupled to one auxiliary power unit. The auxiliary power unit provides at least some, but not all, of the electrical power required by the locomotive.

A-B-A Consist: Multiple locomotives are coupled to one auxiliary power unit. The auxiliary power unit provides a least some, but not all, of the electrical power required by each of the locomotives.

A-B-B Consist: One locomotive is coupled to multiple auxiliary power units. The auxiliary power units together provide at least some of the electrical power required by the locomotive.

Figure 2:
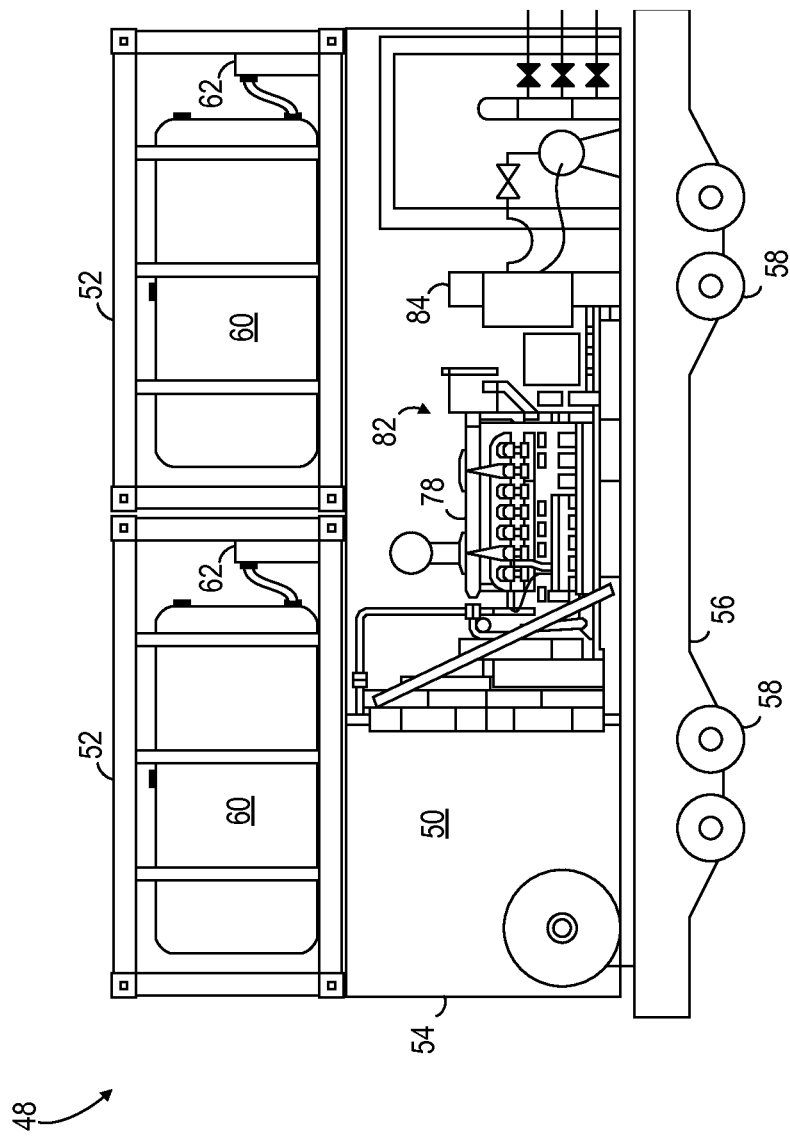
FIG. 2 is a schematic diagram of an auxiliary power unit assembly, in accordance with an embodiment of the invention.

Referring now to FIG. 2, an intermodal container-mounted auxiliary power unit assembly 48, is illustrated in accordance with an embodiment of the invention. Auxiliary power unit assembly 48 includes an auxiliary power unit ("APU") 50 that is designed to interface with one or more locomotives, such as genset diesel locomotive 10 of FIG. 1 and one or more interchangeable gaseous fuel assemblies 52, as described in more detail with respect to FIGS. 6-7. As described in detail below, APU 50 provides additional power to the connected locomotive(s) in the consist under direction of at least one primary locomotive controller. As used herein, the term "auxiliary power unit" or "APU" is used to refer to an autonomously controlled device capable of generating and supplying auxiliary power to a locomotive. The term "autonomous," as used herein, refers to an APU that able to act independently and control the internal operations of the APU independent of external requests, and wherein the internal workings of the APU are opaque or unknown to external control systems.

According to various embodiments, APU 50 is capable of employing one or more alternative fuels. As shown, APU 50 is provided within a container 54 that is fastened to a tender car or rail car 56 in a manner that secures container 54 to the rail car 56. In one embodiment, container 54 is a modified intermodal container and rail car 56 is adapted for carriage of intermodal containers. Providing APU 50 within a removable, intermodal container 54 permits APU 50 to be swapped in and out of service quickly for maintenance and overall at any rail yard that has container lift capability. A ground path is provided between the container 54 and ground via rail car 56, its wheels 58, and the track (not shown). This provides for the dissipation of any static charges that may build up. The system for fastening container 54 to the rail car 56 may have shock isolation features to reduce the severity of shock events that occur in normal railroad operation from APU 50.

As shown, auxiliary power unit assembly 48 includes one or more fuel assemblies 52 stacked atop the container 54 housing APU 50. Fuel assemblies 52, which include pressure tanks 60 housing fuel, are interconnected with APU 50 to deliver fuel to APU 50 under the control of APU 50, as described in more detail below. In the embodiment shown in FIG. 2, fuel assembly managers 62 of fuel assemblies 52 are incorporated within respective frames 152 of fuel assemblies 52 as described with respect to FIG. 6. In an alternative embodiment, fuel assembly manager 62 can be incorporated within the container 54 of APU 50.

Figure 3:
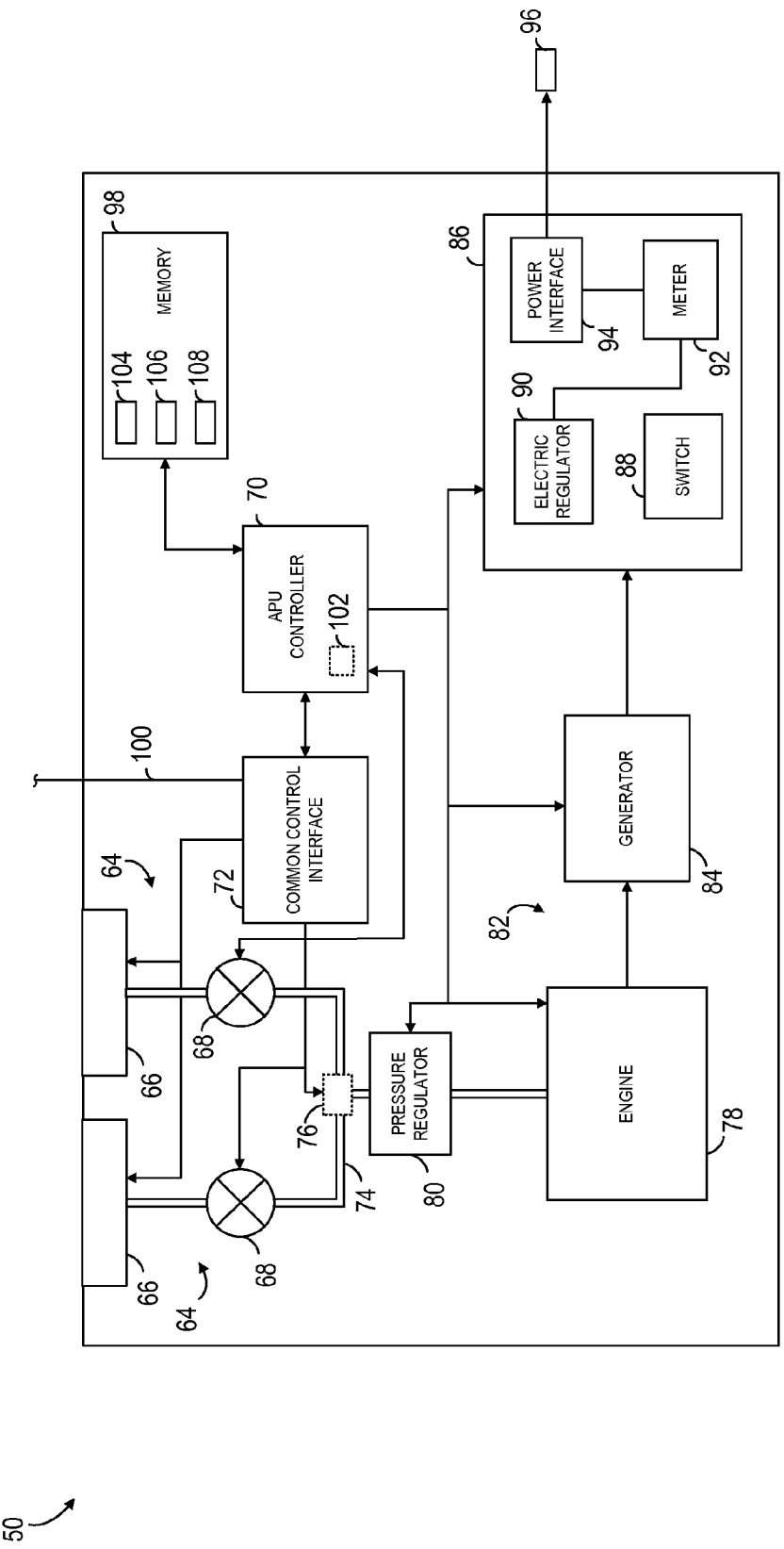
FIG. 3 is a schematic diagram of an auxiliary power unit, in accordance with an embodiment of the invention.

A schematic block diagram of APU 50 is illustrated in FIG. 3. APU 50 includes a number of fuel assembly interfaces 64 for fluidly coupling APU 50 to fuel assemblies 52. While two fuel assembly interfaces 64 are illustrated in FIG. 3, one skilled in the art will recognize that APU 50 may be constructed having only one fuel assembly interface or more than two fuel assembly interfaces to connect any number of fuel assemblies thereto. Each fuel assembly interface 64 includes a respective fuel inlet 66 fluidly coupled to an electronically controlled valve 68, such as, for example a solenoid or other common, remotely actuated high pressure valves. These valves may optionally be integrated as part of the fuel inlet 66. Each fuel assembly interface 64 may include a dedicated control interface to permit an APU controller 70 to communicate with each connected fuel assembly 52. Alternatively, fuel assembly interface 64 may be connected to a common control interface 72 of APU 50. According to one embodiment, fuel inlet 66 is an industry standard fuel connector such as, for example, the GMV-09 receptacle provided by Staubli. Fuel assembly interface 64 may also include an optional power interface to the fuel assembly (not shown for clarity). Additional input fuel sensors (not shown) (e.g., flow, pressure, temperature) may be added to each fuel interface 64 as desired. Electrical connectors (not shown) may be provided to the control and power interfaces so a fuel assembly may be quickly removed and replaced.

Each fuel inlet 66 is fluidly connected to its respective controlled valve 68, which is in turn connected to a fuel manifold 74. Fuel manifold 74 may optionally further comprise a mixing chamber 76 (shown in phantom) in which fuels from one fuel assembly 52 may be mixed with a fuel from another fuel assembly 52. Suitable flow regulation and safety valves may be provided (not shown) to prevent fuels from mixing upstream of a mixing chamber 76. In addition, fuel conditioning equipment such as expansion and fuel routing valves described with respect to fuel assembly 52 in FIG. 6 may be included in manifold 74. APU controller 70 is also electronically connected with the solenoid controlled valves and the manifold controls, which enables it to control the delivery of gaseous fuels to APU engine 78. The manifold 74 routes the resulting gaseous fuel through a pressure regulator 80, which is fluidly connected to APU engine 78. Pressure regulator 80 may optionally be controlled by APU controller 70, depending upon the fuel input demand of the APU engine 78.

APU controller 70 may also be electrically connected to fuel assembly managers 62 of each connected gaseous fuel assembly 52, either via the common control interface 72 or via a dedicated control interface associated with the fuel assembly interface 64. APU controller 70 interacts with fuel assembly managers 62 to receive fuel information and to provide instructions for configuring the gaseous fuel state required.

Auxiliary power unit 50 includes an auxiliary engine-generator set 82 having an engine 78 and a generator 84. According to various embodiments, engine 78 is an internal combustion engine configured to burn a gaseous fuel, such as, for example, a modified diesel, a spark-combustion engine, a radial engine, a gas turbine, and the like. Engine 78 is electrically connected to APU controller 70 to permit APU controller 70 to set engine operating parameters in order to optimize engine performance on the current fuel in use and requested power setting. These engine parameters may include throttle settings (setting for engine RPM), ignition timing settings (for changing combustion timing for different gaseous fuels), combustor settings (for gas turbines), and the like. Engine sensors (not shown for clarity) may be integrated with APU 50 in order to detect the performance of the engine and provide inputs to APU controller 70. These sensors may include an RPM sensor that determines the actual engine RPM, exhaust sensors that determine the composition and/or temperature of exhaust gasses, engine temperature, and engine fault sensors. Other engine control sensors may be added to APU 50 without deviating from the design.

Engine 78 is mechanically connected to generator 84, which converts the mechanical output of engine 78 to electrical energy. Generator 84 is electrically connected to APU controller 70 in order to permit APU controller 70 to control aspects of the electrical generation. APU controller 70 may control generator inputs such as polarity, phase, amount of excitement, desired voltage, shunting, and the like. Optional sensors (not shown) may be connected to the output of generator 84 to measure the output of generator 84 and provide feedback to APU controller 70. According to various embodiments, generator 84 may include special circuitry to cause generator 84 to more quickly react to control inputs that reduce the amount of power being produced. This circuitry reduces the "electrical inertia" of generator 84, effectively permitting the generator output to more quickly match the amount of electrical power that it is instructed to produce. One such method of reducing the electrical inertia of generator 84 is to provide a switched resistor that is used to quickly drop the excitation current in the generator. Another such method is to provide a means to dampen the quickly dampen the excitation field of generator 84 by activating a solenoid controlled shunt across the excitation coils of generator 84. Either method may be controlled by APU controller 70, or may be integrated with generator 84 in a manner so that they automatically are used when the amount of excitation requested is substantially reduced.

As shown in FIG. 3, generator 84 is electrically connected to at least one electrical manager 86, which manages the electricity generated by APU 50 and provides that electricity to a specific locomotive. When APU 50 is connected to more than one locomotive at a time, multiple electrical managers (one per connected locomotive) may be used in order to electrically isolate each locomotive. Electrical isolation supports autonomous fault management by APU 50 and enables providing differing amounts of power to each locomotive (e.g., a first locomotive requests and receives 1 MW, the second locomotive requests and receives 200 kW of power).

According to various embodiments, electrical manager 86 further comprises one or more of a controllable switch 88, a regulator 90, a meter 92, and a power interface 94. Power is routed from the generator 84 thru controllable switch 88 and regulator 90, then optionally thru meter 92, and finally to power interface 94. Controllable switch 88 and regulator 90 may be implemented as discrete devices, or may be optionally integrated into a single device. The order in which controllable switch 88 and regulator 90 are operated inline is implementation dependent, and either component being first in order may be performed without deviating from the invention. Controllable switch 88 enables and disables power flow from auxiliary power unit 50 to a locomotive. Controllable switch 88 may be implemented using either a high amperage switch or relay, or as one or more high power silicon switching module. Regulator 90 limits the amount of power flow between APU 50 and the locomotive to an amount specified by APU controller 70. Meter 92 measures the amount of power actually delivered to the locomotive.

Figure 4:
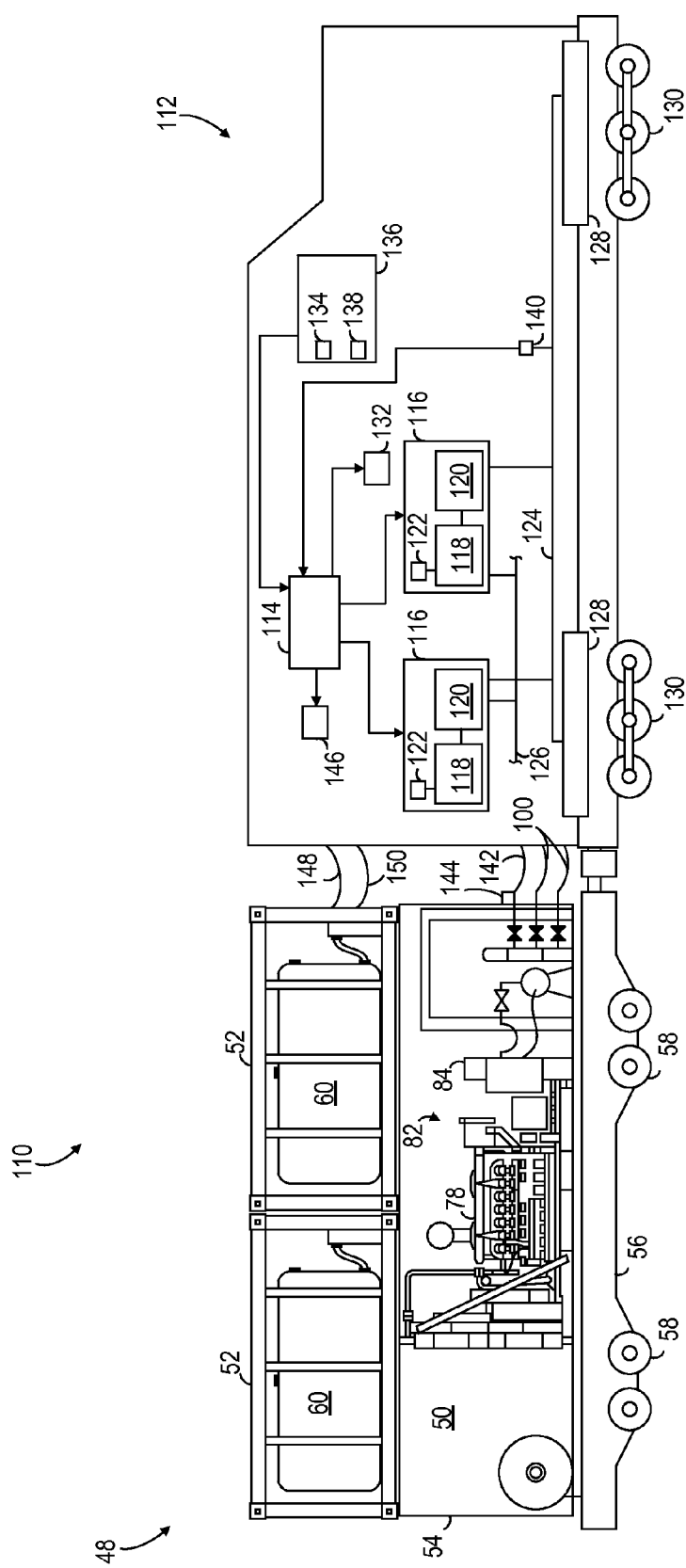
FIG. 4 is a schematic diagram of a locomotive assembly including a genset locomotive and the auxiliary power unit assembly of FIG. 2, in accordance with an embodiment of the invention.

Power interface 94 is configured so that it may be electrically coupled to either or both of traction and auxiliary power busses on a locomotive, as described in more detail with respect to FIG. 4. In one embodiment, the coupling between power interface 94 and the locomotive traction and/or auxiliary power buses is made using cables of a size and construction to handle the anticipated power transmission. The cables are equipped with connectors that permit quick connection and disconnection of the cables from the power interface and the locomotive power bus(es).

Electrical manager 86 further comprises one or more fault sensors 96 which detect problems with the transmission of electrical power to the locomotive. Examples of faults may include ground short, high voltage, low voltage, high current, low current, over temperature, and connector disconnect. Additional fault sensors may be integrated into APU 50 based on design specifications. A single fault sensor may be provided that provides all of the fault detection of fault sensor 96, or the fault sensor may be built of a number of discrete sensors.

Each of these components 88, 90, 92, 94, 96 of electrical manager 86 is electrically connected to APU controller 70, so that APU controller 70 may receive input and configure the operation of each aspect of electrical manager 86 in order to provide the requested amount of power to the locomotive that is electrically connected to each electrical manager 86. Connection may be directly to APU controller 70, or via common control interface 72.

APU controller 70 responds to requests presented on a common control interface 72 provided within APU controller 70. Similarly, APU controller 70 responds to directly connected components of APU 50, such as fault sensors 96, as if they were requests. As used herein, both sources of input are considered requests. In response to these requests, APU controller 70 performs various actions including controlling operation of various components provided within APU controller 70 and reading and/or writing information to an APU controller memory 98.

As shown in FIG. 3, APU controller 70 is electrically connected to common control interface 72, which may be electrically connected to a locomotive control system via a control connection cable 100 coupled to common control interface 72. In some embodiments, multiple common control interfaces 72 may be provided to facilitate connection of APU controller 70 to multiple locomotive controllers and to provide electrical isolation between the locomotives and APU 50. Each control connection cable 100 may utilize connectors to facilitate the rapid connection/disconnection of APU 50 with a locomotive.

Preferably, control connection cable 100 is configured to interface with a CANbus connection or an established locomotive control system interface according to various embodiments. The nature and type of the interface may vary, as may the number of control interfaces interfaced with, without departing from the design.

In an alternative embodiment, common control interface 72 is an RF interface that permits a locomotive controller to control APU 50 without the use of a control connection cable 100. The RF interface permits APU controller 70 to interact with RF-enabled locomotive controllers and with RF-enabled trackside equipment. The RF-interface permits requests and notifications, and in particular, APU controller memory 98 to be interrogated and optionally written to using RF-based technologies such as RFID. This enables trackside equipment to interrogate APU controller memory 98, and to write updated information into memory 98 (such as new meter limits) absent a physical connection to APU controller 70.

In some embodiments, the control connection cable 100 is a multi-wire cable that carries engine control signals (e.g., RPM, generator excitation voltages, return sensor readings) between APU 50 and the locomotive controller. Multi-wire cable carrying signals over long distances in high electromagnetic interference environments is particularly susceptible to signal degradation due to cable length, shorting, or improperly seated connectors, and induced electrical noise.

As described above, APU controller 70 may comprise circuitry to detect and compensate for these types of errors induced by control connection cable 100. Given the low current and voltages present for engine control signals and direct sensor readings, these issues can often be severe enough to cause the APU 50 to cease functioning and must be accounted for when passing engine control signals between locomotive car bodies. Alternatively, the compensation mechanisms may be embodied in control connection cable 100.

APU controller 70 and common control interface 72 may provide additional control adaption circuitry (not shown) that adapts control signals received by APU 50 to account for interference and operating conditions. This adaption circuitry is collectively called control adaptors herein.

Figure 7:
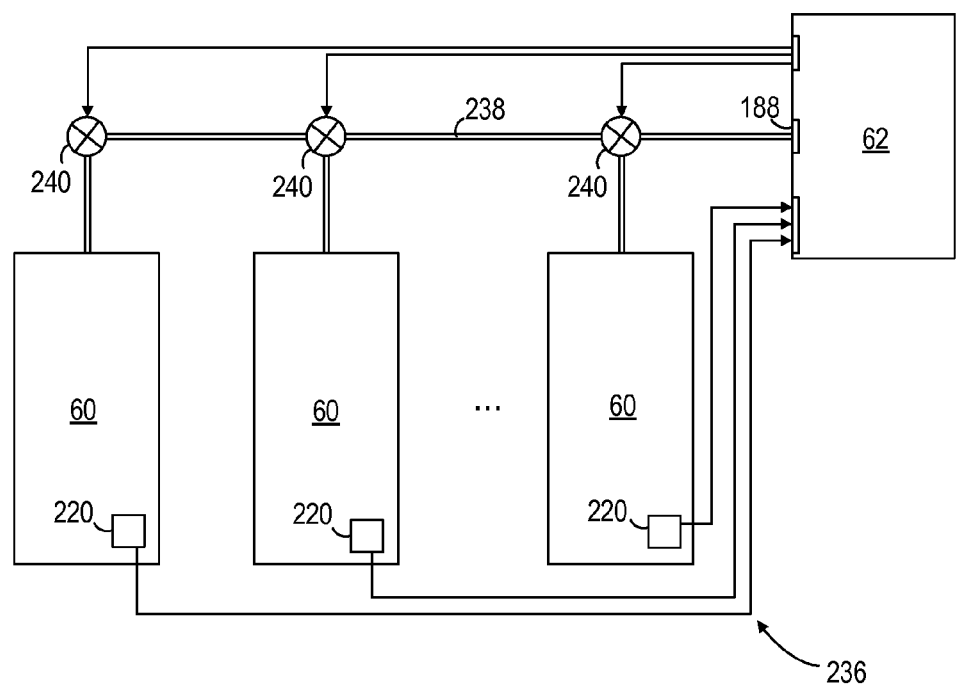
FIG. 7 is a schematic diagram of a pressure tank assembly, in accordance with an embodiment of the invention.

APU controller 70, common control interface 72, or control adaptors may adapt its configuration to provide line conditioning based upon known issues with the control cable between APU 50 and the locomotive controller. In one embodiment, APU controller 70 determines a length of travel of the between the locomotive controller and APU controller 70 based on a length of cable stored in memory module 98 (FIG. 7). Alternatively, APU controller 70 may be configured to determine a length of travel of the power command by transmitting a signal through control connection cables 100 similar to the technique used by a time domain reflectometer. In one embodiment, APU controller 70 includes an optional signal booster 102 (shown in phantom in FIG. 3), that boosts the signal received by APU 50 to account for the signal degradation.

In other embodiments, APU controller 70, common control interface 72, or control cable adaptors translate the engine control signals and return sensor readings between locomotive controller values and the communications techniques used by the common control interface. This type of control adaptor permits an APU 50 to be directly controlled by a locomotive controller that is unaware that APU 50 is not an engine-generator for which it was previously configured, whilst permitting the use of common control interface 72 for other communications with locomotives and fuel assemblies.

According to various embodiments, APU controller 70 is a PLC or micro-controller, along with associated memories 98 and volitile registers (not shown), that provides control electronics for the electronic monitoring, control and reporting of APU operation. APU controller 70 may receive operating power any number of sources, including common control interface 72, from its internally generated power, or other power source (not shown) such as, for example, an internal battery or an external power source. This combination of connections permits APU controller 70 to identify, select, and manage the state of the fuel being received, and configure engine 78 to (e.g., optimally) burn the currently provided fuel(s).

According to various embodiments, APU controller memory module 98 may comprise non-volatile memories, either read-only or read-write, such as ROM or EEPROM, that are used to store information about the identity, capabilities, contents, and/or historical operations of APU 50, as described below.

In one embodiment, APU controller memory module 98 includes a first APU memory 104 that includes identifying information that may be used to uniquely identify APU 50, such identifying information may include a power curve specific to APU 50, and may further include information describing generating and/or power capacity of APU 50, acceptable fuel types for use with APU 50, shutdown delay interval, and the like.

APU controller memory module 98 may also include a second APU memory 106 that stores information about the cost of power provided by APU 50, and any limits on the use of power from APU 50. These limits may include an amount of contracted power (limit and/or remaining)

APU controller memory module 98 may further include a third APU memory 108 that stores information related to the operation of APU 50, including historical sensor readings (e.g., fuel type, temperature and pressure over time), power produced and delivered, use history, and similar history of operating information, as well as inspection history.

APU controller 70 may operate using meter 92 and its memories 98, 104, 106, 108 to determine if there are deliverable power thresholds, and enable/disable power delivery using controllable switch 88 if the limits have been reached. In some embodiments, such as where the railroad owns and operates APU 50, for example, the use of meter 92 and the tracking of limits in the amount of power delivered by APU 50 may be curtailed.

Referring to FIGS. 2 and 3 together, in operation, APU 50 transmits an inquiry to fuel assembly manager 62 of fuel assembly 52 to determine identifying information of fuel assembly 52. As examples, APU 50 may inquire regarding a type of fuel within pressure tank 60, determine requested delivery characteristics of fuel, including delivery pressure and temperature, based upon the type of fuel and/or fuel energy content), and transmit a fuel delivery request to fuel assembly manager 62 based on identified type of fuel. In response to the transmitted request, fuel assembly manager 62 regulates delivery temperature and/or pressure of the fuel.

APU controller 70 may receive requests from one or more locomotive control systems and provide the respective responses to these locomotive control systems, according to various embodiments. APU controller 70 may also provide periodic or asynchronous notifications to one or more locomotive control systems as described below. These instructions are received over at least one of control interfaces 72. APU controller 70 manages these requests in order to respond separately to requests from different interfaces.

Example of requests and responses include:

Report identifying information about APU 50, its engines 78, and/or attached fuel assemblies 52. APU controller 70 responds to the request by providing identifying information about one or more aspects of APU 50 (e.g., its identification type, a serial number), its engines 78 (e.g., engine type, rated horsepower, serial number), and the attached fuel assemblies 52 (e.g., fuel assembly ID, date of last pressure test). One skilled in the art will recognize that the number and types of identifying information to be provided may extend beyond the examples set forth above depending on upon specific implementation aspects of engines 78 and fuel assemblies 52.

Report presence of APU 50. APU controller 70 responds to a request regarding the presence of APU 50 by providing APU 50 the readiness to provide power.

Report on the status of APU 50. APU controller 70 reads one or more memories and/or registers of APU controller 70 and/or attached fuel assemblies 52, or meters and/or sensors of APU 50 and/or fuel assemblies 52, and reports the requested values of the memories, registers, meters, and/or sensors to the requesting locomotive controller.

Read and/or set particular memories of APU controller 70 and/or attached fuel assemblies 52. APU controller 70 operates on the specified memories and/or registers, causing their values to be read, set (or reset) as specified in the request. Setting a memory may involve clearing, setting the memory to a particular value, or incrementing or decrementing the value stored in the memory.

Report operational parameters request. APU controller 70 reads the operational parameters requested from APU controller 70 registers and/or memories and returns them in the response to the request.

Report control parameters request. APU controller 70 reads the control parameters requested from APU controller 70 registers and/or memories and returns them in the response to the request.

Start request. APU controller 70 operates based on the configuration of APU 50, and takes the following steps to implement this request: A) Selects a fuel source and turns on the related valve 68; B) Configures generator 84 to produce no power; C) Configures power interfaces 94 to transmit no power to the locomotives; and D) Starts APU engine 78 and sets it to idle.

Emergency Stop request. This request is made by the locomotive controller when there is an emergency condition that requires the immediate shutdown of APU 50. APU controller 70 operates on the configuration of APU 50, and takes the following steps to implement this request: A) If equipped with the optional resistive load, shunt the resistive load across the outputs of generator 84, or if APU 50 is configured with a quick-unload generator, configure generator 84 to immediately adjust the output power; B) Send a notification to all connected locomotive controllers that APU 50 will discontinue providing power; C) Disable power interfaces 94 by logically commanding each switch 192 to disconnect APU 50 from a connected locomotive; D) Turn off the controllable valve 68 to disconnect fuel assemblies 52; E) Configure APU engine/generator 78, 84 to produce no power by adjusting the engine and generator configurations; F) Turn off APU engine 78 using the control interface 72 to engine 78; and G) Send notification to all connected locomotive controllers that APU 50 is offline.

Stop request. APU controller 70 operates based on the configuration of APU 50, and takes the following steps to implement this request: A) Send a notification to all connected locomotive controllers that APU 50 will discontinue providing power; B) Set a timer until power down using the shutdown delay interval configured in either the request or APU controller memory 98; C) Monitor the control interface 72 for power adjustment requests to remove APU 50 from the power requirements of the connected locomotives, servicing those requests as they arrive; D) Upon expiration of the timer, or when no power is requested from APU 50, configure APU engine/generator 78, 84 to produce no power by adjusting the engine and generator configurations; E) Disable the power interfaces 94 by logically commanding each switch 192 to disconnect APU 50 from a connected locomotive; F) Turn off APU engine 78 using the control interface 72 to engine 78; G) Turn off controllable valve 120 to disconnect fuel assemblies 52; and H) Send notification to all connected locomotive controllers that APU 50 is offline.

Power request. Power request to provide a specific amount power to a locomotive traction bus, as described in more detail with respect to FIG. 4. The request may further comprise an urgency indicator, which indicates to APU controller 70 the urgency of the request. Urgent requests cause APU controller 70 to reorder the operating steps to remove power flowing from APU 50 first, and then adjust the internal operations of APU 50 for efficient operations. APU controller 70 configures controllable switch 88 and electric regulator 90 to deliver the requested amount of power to the power output. In some implementations, controllable switch 88 and electric regulator 90 may be the same device. Power delivered to the power output is may be metered using meter 92, which is read by APU controller 70. APU controller 70 may report these readings to common control interface 72, and/or store them in APU controller memory 98 for later use.

APU controller 70 operates on the APU configuration, and takes the following steps to implement this request: A) If the request is urgent and the power request is for a reduction in power provided (including a reduction to 0), configure power interface 94 attached to the requesting locomotive to provide the amount of requested power, or if the amount of power requested reduces the overall amount of power delivered by more than a threshold stored in an APU controller memory 98, treat the reduction as an unloading request (see below); B) Total the requested power from all current locomotive power requests; C) Determine the amount of power that APU 50 can generate (in some cases, this value is stored in APU controller memory 98, in other cases, the amount of power APU 50 can generate is a function of fuel currently selected, altitude, temperature, and other operating parameters and is calculated by APU controller 70); D) Determine if all of the request power can be provided, and if not, reject the request by sending a response back to the requesting locomotive controller; E) Configure engine 78 and generator 84 to produce the desired amount of power; F) Configure power interfaces 94 to provide the amount of requested power to each attached locomotive; and G) Send response to the locomotive controllers indicating the new power level being provided.

Adjust power/unloading: The locomotive controller requests that APU 50 reduce the power it provides to the locomotive, typically for a short period of time. These types of requests are made by the locomotive controller when it encounters wheel slip or adhesion issues, and typically specify an amount of temporary power reduction. Unloading requests are often time critical and require priority handling by APU controller 70. In some cases, the request will also include an indication requesting "rapid" removal of power. APU controller 70 operates on the APU configuration, and takes the following steps to implement this request: A) If the reduction in power requested is more than a first threshold configured in APU controller memory 98 and rapid removal of power is requested, configure generator 84 to quickly discontinue power generation by generator 84 by activating features of generator 84 designed quickly reduce the amount of power produced by generator 84; B) Configure power interface 94 connected to the requesting locomotive to adjust the amount of power provided to the locomotive by changing the configuration of power regulator 90; E) Configure APU engine/generator 78, 84 to produce the requested amount of power by adjusting the engine and generator configurations; and G) Send response to the locomotive controllers indicating the new power level being provided.

As would be understood by one skilled in the art, other requests and responses may be added to APU controller 70 without deviating from the scope of this invention.

APU controller 70 also services fault indications, either from fault sensors directly connected to APU controller 70 or from notifications received thru common control interface 72. After receiving a fault indication, APU controller 70 determines the nature of the fault and its expected response. The list of faults and expected responses is preferably stored in a configuration memory of APU controller 70. An exemplary list of faults and their responses is given below:

Control interface lost to locomotive controller: APU controller 70 implements transient and extended loss of the control connection between APU 50 and the locomotive controller. When a loss or corruption of signal is detected by APU controller 70, APU controller 70 checks its fault sensors to determine if one or more faults have been detected in connections between APU 50 and locomotive. If not, APU controller 70 checks for resumption of the signal within a time limit specified by a configuration threshold defined in APU controller memory 98. APU controller 70 may optionally transmit one or more messages to the locomotive controller informing it of the loss of signal. If the signal is not restored within the specified time limit, APU controller 70 implements an immediate cessation of power provision at power interface 94 corresponding to the locomotive controller for which control signals were lost, and then implements a power command to stop generating power for that locomotive. An exemplary embodiment describing how power is removed from power interface 94, see "Power interface fault" handling below. APU controller 70 may also transmit to the locomotive controller operational or status information indicating its change in power generation.

Power interface fault: APU controller 70 implements both an immediate disconnect of APU 50 from the locomotive connected to power interface 94, and also implements a power command to stop generating power for that locomotive corresponding to power interface 94 and by changing the settings on electrical manager 86 components in order to quickly remove current from power interface 94. For example, APU controller 70 may logically control switch 88 to disconnect power between APU 50 and locomotive. Alternatively, APU controller 70 may control the regulator 90 to provide no power to power interface 94. The control instructions sent to the electrical manager components will vary depending upon the types of components and their response time and ability to operate when carrying a full current load. For example, APU controller 70 may adjust regulator 90 to reduce the current flow, and then disconnect using switch 88, or may simply open switch 88 depending upon the amount of current flowing at the time. Additionally, APU controller 70 may configure generator 84 to quickly discontinue producing power by activating the rapid power removal features of generator 84. The precise order and nature of component controlling by APU controller 70 may be adjusted without deviating from the scope of the invention, and is dictated by the amount of power currently being provided, the number of locomotives for which power is being provided, and the limitations of the power switching and regulation hardware used. APU controller 70 may also transmit to the locomotive controller operational or status information indicating its change in power generation.

Equipment fault: APU controller 70 receives this fault if a piece of equipment in APU 50 malfunctions or ceases to operate. These types of faults may include cooling fan failure, fuel interface failures, power interface failures, and the like. APU controller 70 determines, based upon a table of equipment and fault type, one or more appropriate responses from the following: A) Shutting down APU 50; B) Removing the faulting equipment from use (and removing that part of the APU's functionality); C) Notifying one or more locomotive controllers of the fault (and any new configuration or control values such as the amount of power available); D) Logging the fault in APU controller memory 98; E) Recalculating fuel and power efficiency graphs and power available values and updating the values stored in APU controller memory 98; F) Reducing the amount of power provided to one or more power interfaces; and G) Taking no action, as examples. Each of these actions may translate into one or more APU requests that are processed by APU controller 70.

In an example, upon receiving a disconnect signal, APU controller 70 is configured to initiate a shutdown protocol for auxiliary engine-generator set 82. The shutdown protocol may logically disconnect all power interfaces (as described above), stopping power generation by instructing the generator to stop producing power, include shunting auxiliary engine-generator set 82 within a very short time period after detecting the disconnection, such as, for example, approximately 10 milliseconds, and turning off auxiliary engine-generator set 82.

In some cases, the faults recorded by APU controller 70 are operational in nature, such as control panel being opened or a connect/disconnect occurring on an interface that is not currently in use. In these cases, APU controller 70 actions may include: logging the fault, taking no action, sending a notification via a common control interface 72.

APU controller 70 also handles other operational aspects of APU 50. Some of these aspects and the APU controller's 70 handling of them are described below.

When operating with removable fuel assemblies 52, APU 50 may receive notifications of fuel assembly being added or removed from APU 50. When a new fuel assembly is added to an APU configuration, APU controller 70 communicates with fuel assembly using control interface 72 to determine the fuel assembly information, including ID, type of fuel, amount of fuel, and other parameters. APU controller 70 then stores that information in APU controller memory 98. APU controller 70 then recomputes operating parameters based upon the fuel information and updates its operational graphs to represent operation using the fuel in fuel assembly 52.

APU controller 72 performs power cost calculations when factors related to the cost of providing power changes. In an embodiment, the power cost calculation is a calculation based upon the cost of fuel and a conversion factor indicative of the power source's efficiency of converting a unit of fuel into power (e.g., kilowatts per gallon). The calculations can also utilize the energy content of fuel provided. In some embodiments, the calculations produce a scalar value. In others, they produce an n-dimensional based upon one or more engine performance metrics (e.g., amount of power produced, engine RPM, generator excitement voltages, one or more metrics related to the fuel being used (price of fuel, energy content of fuel), and one or more metrics related to operating conditions (e.g., temperature, air pressure). The results of these calculations are stored in memory module 98 of APU 50 for further use.

APU 50 may need to switch a fuel source/fuel assemblies as a first fuel assembly 52 becomes empty. If APU 50 can be shut down, this is a simple process of closing valve 68 to the first fuel assembly 52 and opening the valve 68 to the second fuel assembly 52. The operation is more complex when the switch must occur "on the fly", and even more particularly when the pressure tanks 60 of fuel assemblies 52 hold different fuels and differing engine operating parameters are associated with using each type of fuels most efficiently. In this case, APU controller 70 opens valve 68 corresponding to both pressure tanks 60 simultaneously, allowing the fuels to mix in common manifold 238. APU controller 70 then adjusts pressure regulator 80 and engine parameters to burn the mix of fuels. After engine 78 has stabilized on the mix of fuels, valve 68 on the first tank is closed and pressure regulator 80 and engine parameters are again reset to optimally burn the fuel from the second tank. A similar procedure can be used to transition between tanks when a first tank is running out of fuel.

One aspect of APU 50 with multiple interchangeable fuel assemblies 52 is that fuel assemblies 52 can be changed "on the fly" while APU 50 is still operating. This is accomplished by the following process: A) APU controller 70 transitions fuel use to fuel assembly 52 that is not being changed and closes valve 68 on the fuel assembly to be changed; B) Control cabling and fuel hoses are disconnected (APU controller 70 recognizes the disconnect, but takes no action because the tank is already logically disconnected from APU 50); C) Fuel assembly 52 is unattached from APU 50, and then physically removed from APU 50 a new fuel assembly is attached to APU 50 in its place, and the fuel and control lines attached; D) APU controller 70 recognizes a new fuel assembly is attached, and performs the "new fuel assembly" process described above.

Changes in operating conditions, fuel assemblies, equipment status, and related items occasionally cause APU controller 70 to recalculate its control parameters. For example, if different settings are needed for engine 78 to attain a specific power level, APU controller 70 is aware of this from its monitoring of engine performance vs. power output. If the difference is greater than a threshold set in APU controller memory 98, APU controller 70 calculates the new operational parameters and recalculates its performance graphs. After storing these new parameters and graphs, it notifies any attached locomotive controllers of the new parameters and graphs.

Similarly, APU controller 70 changes such as the change in control parameters, available, or currently used fuel may results in differing total costs of power produced by APU 50. In these circumstances, APU 50 recalculates its power cost and power cost graphs, and stores them in APU controller memory 98, and then notifies any locomotive controllers connected to APU 50 of the changes in power cost.

The above description provides an autonomous APU that can provide auxiliary power to one or more locomotives upon receiving commands from each locomotive's locomotive controller. An APU that is able to take certain actions autonomously offloads the work of the locomotive controller, permits an APU to provide power to multiple locomotives independently, handles certain fault conditions that the locomotive controller cannot handle, and generally improves safety and operational characteristics of providing power to locomotive power buses.

The response time to certain faults when providing power between rail cars a key factor to operating safety. For example, a severed power cable energized with 1 Mw of power is hazardous to rail equipment, locomotive operators, and nearby people. Similarly, automated connection and valve management of fuel input lines when switching fuel sources is also important. Lastly, recognizing APU-specific faults and operating conditions in sufficient time to react and mitigate any operational issues that arise lets the APU operate within the locomotive controller having detailed knowledge of internal APU workings. The APU controller typically needs to respond to change in operating conditions very quickly (e.g., within 10 msec, 100 msec, 1 sec, or 10 sec, depending upon the type of change). For example, ground faults and disconnection faults (when the power interface is powered) should be responded to quickly to de-energize the power bus. Similarly, fuel system faults should be responded to quickly to prevent fuel spills. Other operational issues, such as fuel amounts crossing a lower threshold, chassis temperature or alarms, for example, can be handled more slowly. Still other operations, particularly those that require communications interactions with fuel assemblies or lengthy calculations, may complete in 10 or more seconds.

One important aspect of APU controller handling is response time to locomotive controller requests. Locomotive controllers operate in very short duration control loops, and response time of APUs to locomotive controller requests is important to the successful operation of a locomotive control with an autonomous APU. Accordingly, the APU controller must provide response times to requests received from locomotive controllers within a configuration defined amount of time (varies depending upon the locomotive controller) or be considered non-responsive. A non-responsive APU controller would be considered a fault condition by the locomotive controller and be handled accordingly. Some locomotive controller requests may contain an indication that the request should be handled quickly, such as power removal requests being generated in conjunction with wheel slip or fault events.

Referring now to FIG. 4, a locomotive consist or locomotive assembly 110 is illustrated that includes a genset locomotive 112 coupled to auxiliary power unit assembly 48 described with respect to FIGS. 2 and 3. As shown, genset locomotive 112 includes a primary locomotive controller 114 that manages multiple locomotive engine-generator sets 116 that operate in response to received commands from primary locomotive controller 114. While genset locomotive 112 is illustrated as including two locomotive engine-generator sets 116, genset locomotive 112 may include additional locomotive engine-generator sets according to various embodiments. Further, according to an alternative embodiment, locomotive assembly 110 may be configured with a locomotive having a single engine-generator set.

Each locomotive engine-generator set 116 includes a respective engine 118, generator 120, and sensor system 122. Generators 120 produce electricity for delivery to a locomotive traction bus 124 and an auxiliary power bus 126. Generators 120 are configured to convert the mechanical energy provided by engines 118 into a form acceptable to one or more traction motors 128 (DC or AC type) configured to drive the plurality of axles coupled to the driving wheels 130 of locomotive 112, and to provide DC or AC power to the respective auxiliary power bus 126.

Locomotive 112 also includes an engine start and stop control 132 which interfaces with primary locomotive controller 114 and is linked to locomotive engine-generator sets 116 to initiate their operation and to terminate their operation. Engine start and stop control 132 independently controls each locomotive engine-generator set 116. Sensors 116 of each locomotive engine-generator set 116 provide information to primary locomotive controller 114 regarding the status and/or operation of each locomotive engine-generator set 116 (e.g., various parameters of the engines 118 such as rpms, operating power output, temperature and other engine operating parameters).

In some embodiments, one or more locomotive engine-generator sets 116 are operated in response to a throttle position input sensor 134 (or an rpm sensor) which indicates the position of the throttle as controlled by the operator on an operator interface 136. Operator interface 136 may also include an optional operator engine start input 138 (shown in phantom) where the operator can directly or indirectly instruct primary locomotive controller 114 (e.g., via a keypad (not shown)) with regard to operation of engines 118 or termination of operation of the engines 118.

The correlation between engine RPM (or throttle setting) and the amount of electricity generated is stored within primary locomotive controller 114. Power sensors 140 on the locomotive fraction bus 124 and auxiliary power bus 126 provide information to primary locomotive controller 114 on the amount of power actually being provided on the busses 124, 126. Primary locomotive controller 114 manages the amount of power present on the busses 124, 126 by adjusting the engine RPM and generator excitement (by changing the control voltage) and by measuring the amount of power present on the various busses 124, 126 using the power sensors 140. Primary locomotive controller 114 also calculates and manages locomotive location and anticipated power needs.

Genset locomotive 112 is connected to APU 50 of auxiliary power unit assembly 48 by way of a number of power cables 142 and control cables 100. The number of control cables 100 is determined based on design specifications for the amperage and interconnection between locomotive 112, APU 50, and fuel assemblies 52. In some embodiments, locomotive controller 114 provides APU control instructions on a dedicated APU control interface. In a preferred embodiment, this interface provides signaling that is electromagnetic interference (EMI) resistant (e.g., CANbus). In other embodiments, control cables 100 may include converters (described above) that convert locomotive controller engine control voltages (e.g., RPM, generator excitement) to/from EMI resistant signaling means. In other embodiments, control cables 100 may include converters (not shown) to convert locomotive controller engine control voltages (e.g., RPM, generator excitement) to APU controller instructions. These converters may be implemented individually or in series as desired to provide a signaling path between the locomotive controller 114 and APU control interface 72. While APU 50 is illustrated in FIG. 4 as being connected to a single genset locomotive 112, one skilled in the art will recognize that APU 50 may be coupled to multiple locomotives via respective sets of power and control cables.

According to one embodiment, at least one of APU controller 70 and primary locomotive controller 114 is configured to detect a fault in the transmission of power and/or control commands through control cables 100. Upon detection of the fault, primary locomotive controller 114 may be configured take one or more actions in response to the fault condition. If the fault condition is in the control cable connection 100 between the locomotive controller 114 and APU 50, example actions may include: resend one or more the power and/or control commands to APU 50, send a status command to APU 50, read one or more sensors and make a determination of the seriousness of the fault condition, alert the locomotive operator thru a display or alerting device (e.g., light, alarm signal). Other actions may be programmed into the locomotive controller 114 in response to communications faults between the locomotive controller and APU 50 as would be understood by those skilled in the art. Alternatively, or in addition thereto, primary locomotive controller 114 may be programmed to modify a previously sent power command upon detection of the fault, or to set APU 50 to an "unavailable" status and reallocate power requirements allocated to APU 50 to other engine/generators. For example, if APU 50 is showing a connection fault on its command circuit and it is not providing power to the power bus 124 as indicated by power bus sensors 140, locomotive controller 114 may decide that APU 50 is no longer functioning and reallocate the power requirements allocated to APU 50 to a primary locomotive engine/generator 116, causing it to increase its RPMs and alternator excitement voltages in order to provide the missing power to the power bus.

In some instances, locomotive controller 114 is expecting a response from APU controller 70 that is not received, or is receiving in an unusable form. In this case, the locomotive controller 114 may take one or more actions to respond to the missing response. For example, these actions may include any or all of the following: resend one or more the power and/or control commands to APU 50; send a status command to APU 50; read one or more sensors and make a determination of the seriousness of the fault condition; alert the locomotive operator using a display or alerting device (e.g., light, alarm signal). Other actions may be programmed into locomotive controller 114 in response to communications faults between locomotive controller 114 and APU 70 as would be understood by those skilled in the art.

In other instances, locomotive controller 114 may receive notifications from APU controller 70 asynchronously. These notifications may comprise event or alert notifications, or may simply comprise information provided by APU controller 70 that locomotive controller 114 may consider in managing locomotive consist 110. The actions taken by locomotive controller 114 in response to these notifications may include any or all of the following: do nothing, send a command to APU controller 70 requesting additional information about APU controller memories 98; process the received information as a fault indication or as a connection notification; process the received information as a sensor reading related to APU operation; store the received information in locomotive controller memory 146 for use during power cost calculations; store the received information in locomotive controller memory 146 for use in subsequent power allocation calculations; recalculate the cost of power provided by APU 50 for use in power allocation decisions; reallocate power allocation to APU 50; and command APU 50 to provide a differing amount of power to locomotive power bus 124. Other actions may be programmed into locomotive controller 114 in response to notifications received by locomotive controller 114 from APU 50 as would be understood by those skilled in the art.

In operation, primary locomotive controller 114 transmits power request signals to APU controller 70 via control cables 142. Responsive to receipt of the power request signals, APU controller 70 selectively controls the auxiliary engine-generator set 82 to produce a desired amount of power. The power produced by APU auxiliary engine-generator set 82 is then transmitted to locomotive traction bus 124 via power cables 142.

While auxiliary power unit assembly 48 is illustrated in FIG. 4 as being directly connected to genset locomotive 112, the distance between auxiliary power unit assembly 48 and genset locomotive 112 may vary greatly with the addition of additional locomotives and/or additional auxiliary power unit assemblies to locomotive consist 110. Depending upon the length of travel of the power command between the primary locomotive controller 114 and the APU controller 70, a certain amount of voltage drop will occur in the power command causing a signal degradation of the originally transmitted power command. According to one embodiment of the invention, APU controller 70 is configured to identify an amount of signal degradation in the power command received from primary locomotive controller 114 and adjust the power command to account for the identified signal degradation. APU controller 70 then uses the adjusted power command to selectively control auxiliary engine-generator set 82. In one embodiment, APU controller 70 determines a length of travel of the power command based on a length of cable stored in memory module 98 (FIG. 3). Alternatively, APU controller 70 may be configured to determine a length of travel of the power command by transmitting a signal through control cables 100 similar to the technique used by a time domain reflectometer. In one embodiment, APU controller 70 includes an optional signal booster 102 (shown in phantom in FIG. 3), that boosts the power command received by auxiliary power unit 50 to account for the signal degradation.

APU units 50 provide identifying information to primary locomotive controller 114 via control interface 72. This identifying information includes identifying information from memory module 98 of APU 50 as well as identifying information from memory module 206 of fuel assemblies 52 coupled to APU 50. As described above with respect to FIGS. 3 and 7, indentifying information stored within memory modules 206, 98 may include an equipment configuration of APU 50 and a cost of fuel within fuel assembly 52 as examples. Based on the identifying information received from APU 50 and a current total power demand of genset locomotive 112, primary locomotive controller 114 makes a determination as to how to allocate power generation between locomotive engine-generator sets 116 and auxiliary power unit 50. According to one embodiment, APU 50 is programmed to periodically transmit identifying information to primary locomotive controller 114, such as, for example, (as a notification) at predefined time intervals.

According to one embodiment, primary locomotive controller 114 is also in communication with one or more fuel assemblies 52, which provide gaseous fuel to one or more of the locomotive engines 78 and/or APU 50. Fuel assemblies 52 also provide sensor information regard fuel state, fuel type, and fuel costs to primary locomotive controller 114.

As shown in FIG. 4, a disconnect sensor 144 is coupled to power cables 142, which electrically connect genset locomotive 112 and APU 50. Disconnect sensor 144 is configured to sense a connection status of auxiliary engine-generator set 82 with locomotive traction bus 124. Should a decoupling occur between genset locomotive 112 and rail car 56 and/or a disconnection occur between power cables 142 and locomotive traction bus 124, disconnect sensor 144 will transmit an alert signal to at least one of APU controller 70 and locomotive controller 114 indicating the disconnection.

According to one embodiment, primary locomotive controller 114 is a traditional locomotive controller that has been modified to permit it recognize and to communicate with APU 50 and fuel assemblies 52. A first modification is for primary locomotive controller 114 to recognize that one or more of its power sources may be intermittently present, have differing identifying information each time it is connected, may have differing operating characteristics from time to time, and may provide power at a differing cost that the primary engine/generator(s) 116 on the locomotive chassis.

Locomotive controller 114 may recognize that something is connected to its control line based upon the presence or absence of voltage, current or capacitance on the line. Upon recognizing the connection of a new device to the locomotive control line (and the connection of the power and control circuits or cables), locomotive controller 114 undertakes the following steps to determine information about APU 50: A) Communicate with the device to determine if indicated connection was to an APU, a fuel assembly, or some other device, and if the device is not an APU or fuel assembly, locomotive controller 114 takes an action consistent with a fault handling (as described above); B) locomotive controller 114 sends a command to the device to determine device identifying information and receives a response, and if a response is not received, it is handled as described above; C) locomotive controller 114 optionally sends additional commands to the device and receives additional responses from the device to determine additional information about the device, or looks up information about the device, either in a local memory or from a remote computer, to determine the additional information, D) Locomotive controller 114 stores the information received in memory 146 for subsequent use; and E) Based upon the type of device connected, locomotive controller 114 takes additional actions selected from the set of actions: perform power cost calculations, perform power allocation, send a power command to APU 50, and select a fuel assembly.

Locomotive controller 114 performs power cost calculations as the cost of providing power changes. In an embodiment, the power cost calculation is a scalar value provided by an external device, a calculation based upon the cost of fuel and a conversion factor indicative of the power source's efficiency of converting a unit of fuel into power (e.g., kilowatts per gallon). The calculations can also utilize the energy content of fuel provided. In some embodiments, the calculations produce a scalar value. In others, the calculations produce an n-dimensional based upon one or more engine performance metrics (e.g., amount of power produced, engine RPM, generator excitement voltages, one or more metrics related to the fuel being used (price of fuel, energy content of fuel), and one or more metrics related to operating conditions (e.g., temperature, air pressure). The results of these calculations are stored in locomotive controller memory 146 for further use.

Locomotive controller 114 sends a power command to APU controller 70 instructing it to provide a specific amount of power to the power bus. Optionally, this power command may include an indication that the power command should be performed quickly, such as when locomotive controller 114 is processing wheel slip or faults. The power command send to APU controller 70 typically differs from normal engine control voltages in that it specifies an amount of power (current and voltage) to provide because locomotive controller 114 is generally unaware of the power source settings associated with providing a desired amount of power. Because locomotive controller 114 is unaware of these settings permits, locomotive controller 114 can interoperate with APUs 50 using differing power sources. This provides a significant operational advantage.

After locomotive controller 114 sends a power command to APU controller 70, APU controller 70 responds to locomotive controller 114 in several ways. First, APU controller 70 responds to the power command with a response on the control cable connection 100 to the requesting locomotive controller 114. If locomotive controller 114 does not receive the response within a configuration determined timeframe, locomotive controller 114 takes corrective action as described above for missed response. Secondly, locomotive controller 114 monitors sensors 140 on power bus 124 to determine if APU 50 as provided the requested power. If the power requested does not appear on power bus 124 within a configuration determined, or dynamically determined timeframe, locomotive controller 114 handles this failure to respond as a fault (as described above).

One aspect of locomotive controller 114 is to manage locomotive consist 110 with respect to overall emissions produced. APUs 50 may provide to locomotive controller 114 information (graphs or scalar metrics) that represent the emissions produced or with respect to emissions produced by each engine. APU 50 under specific operating conditions. In order to obtain emissions levels which adhere within certain limits or which better match certain target objectives, locomotive controller 114 may determine that APU 50 should operate using a certain balance of one fuel in preference to another (e.g., natural gas as opposed to syngas), or to use a certain mix of the two fuels over a particular time scale. For instance, a locomotive may not be able to achieve desired management of both NOx and particulate matter emissions over a certain distance or time by running natural gas 100% of the time. Locomotive controller 114 makes this determination based upon higher level calculations based in part upon the emissions profile of the power sources available to locomotive controller 114, their emissions profile under particular load conditions, fuels available, and the location of locomotive 112 and its projected load conditions. Locomotive controller 114, when making these calculations, adds the steps of sending a request to one more of the APU 50, fuel assemblies 52 to determine the fuel types and emissions profiles for power requests to APU 50. Locomotive controller 114 receives the requested information, stores it in memory 146, and then calculates the emissions profiles. Once the emissions profiles are calculated, locomotive controller 114 makes a determination regarding fuels to use and power allocations, and instructs APU 50 and/or fuel assemblies 52 appropriately.

The auxiliary power enabled locomotive controller 114, being a genset style locomotive controller, is able to make power allocations between power sources. The difference is that the auxiliary power enabled locomotive controller 114 is able to determine if an APU 50 is connected, and if so, use APU 50 as one of the available power sources.

Primary locomotive controller 114 is coupled to a memory module 146 within which is stored its current cost of producing power using the standard power. The current costs of producing power may be a unique number, or may be a sequence of numbers stored a table based upon engine RPM. In one embodiment, memory module 146 also stores a price of fuel for locomotive engines 78. This price can be manually or electronically updated on a periodic basis. Primary locomotive controller 114, using this table, and the known engine RPMS, can compute the cost of providing a unit of power to the locomotive's traction and/or auxiliary power busses 124, 126. This cost is called the internal generation cost.

Knowing the current cost of power, primary locomotive controller 114 may then seek lower cost power from APU 50 when APU 50 is able to provide power for the locomotive busses 124, 126 at costs below the internal generation cost. Primary locomotive controller 114 reads the current power cost from APU controller 70, and compares the internal generation cost to the price provided by APU controller 70, and selects engine throttle and APU power settings to obtain power from at least one of the lowest cost source and a combination of sources whose costs aggregate to the lowest total cost. In some cases, this means primary locomotive controller 114 will power down the onboard engines 78 and use only power produced by APU 50. In other cases, primary locomotive controller 114 will use power generated by both APU 50 and onboard engines 78. In still other cases, primary locomotive controller 114 will idle APU 50 and use only onboard power produced by auxiliary engine-generator sets 82.

In one embodiment, the power command transmitted by primary locomotive controller 114 will specify an amount of power required and APU 50 will self-configure to provide that amount of power to the locomotive. In this way, APU 50 can provide power to multiple locomotives, and run at a higher level of power production sufficient to provide power to two locomotives. Power regulator(s) 90 in APU 50 may be used to allocate power between the locomotives in this case. In other embodiments, the power command transmitted by primary locomotive controller 114 may specify a desired operating point on a performance graph of APU 50 or a desired power level of the output power of APU 50.

In an optimization to this algorithm, railroads may purchase bulk power from power providers using APU 50 as described above. Their power purchases may be reporting by the meter 92 in APU 50. Primary locomotive controller 114 may interrogate the meter 92 and determine the amount of power remaining in the current bulk purchase, and make its power allocation decisions based at least in part upon the amount of power previously purchased. This is especially advantageous when the bulk purchases are "use or lose", and it is advantageous to the locomotive operator to use all of their previously purchased power. Depending upon the embodiment, the optimization algorithm can also include the aspect that with APU 50 operating, the overall power available to the traction bus 124 can be higher that with the locomotive(s) alone, and there may be portions of the route where the higher power has value to the railroad and therefore it is beneficial for the system to reserve sufficient fuel for those portions of the route. As such, the algorithm is looking at several time periods to optimize the value of APU operation, not simply as the minimum cost of power now.

In implementing these operations, the locomotive controller 114 includes several steps in its master control routine. The master control routine is executed periodical by locomotive controller 114. The master control routine monitors and reacts to operational conditions such as wheel slip, power requirements and availability, and performs power allocations. In the example set forth below the detection of the operational condition of wheel slip is described in detail. However, one skilled in the art will understood that other operational conditions processed by locomotive controller 114 during this master control loop that initiate adjustment in power allocated or provided by locomotive consist 110 follow similar operational patterns and may be implemented without deviating from the scope of the invention.

When the locomotive controller control loop starts, it checks for faults and handles them as described elsewhere. Locomotive controller 114 then checks for wheel slip, and upon detecting wheel slip is occurring, it immediately makes an assessment of the severity of the wheel slip. If the wheel slip is severe, locomotive controller 114 instructs the primary power sources and the auxiliary power sources currently providing power to locomotive 112 to immediately reduce the amount of power provided to locomotive 112 by an amount proportional to the amount of slip. The power reduction may be made across all power sources, or may be selectively made against one or more power sources without deviating from the scope of the invention. Locomotive controller 114 directly configures its primary engine-generators 116 to effect this power reduction, and sends a power adjustment or a power control message to a connected auxiliary power source (e.g., APU 50). In both cases, the message is marked for fast implementation by the auxiliary power source, causing rapid removal of power in accordance to the command. The selection of a power adjustment or power control message is made by locomotive controller 114 on the basis of the amount of wheel slip detected; mild to moderate wheel slip may indicate a short term power adjustment is appropriate, and more severe wheel slippage may indicate that a change in power requested is needed. If wheel slip was detected, locomotive controller 114 restarts the control cycle to determine if faults or operational conditions such as wheel slip are occurring. Once operational conditions are processed, locomotive controller 114 checks for messages from auxiliary power sources 50 or fuel assemblies 52 that have not been processed. These messages are processed, and stored information (e.g., ID information, operational information, etc.) about the power sources and/or fuel assemblies are updated as required. These messages may indicate a change in a removably connected power source 50 and/or fuel assembly 52, fuel state or type, the amount of power provided by an auxiliary power source, a cost of power provided, an updated graph, or other change that locomotive controller 114 takes into account when optimizing the performance of locomotive consist 110.

If power, fuel, or cost information is updated, locomotive controller 114 then conducts a series of interactions with the power sources and fuel assemblies to update its stored information to current values. Locomotive controller 114 then recalculates any information it has stored based upon the updated stored values.

After completing the update of the stored information, locomotive controller 114 determines information required to support the power allocation process. This information includes the current amount of power required by the locomotive (based upon throttle notch settings, auxiliary loads, traction motor requirements, etc.), and determines the current amount of power available by totaling the amount of power each power source may provide. It further determines the power cost for each power source, either as a scalar metric or as an efficiency graph that describes the power costs relative to the amount of power provided, or as a metric or efficiency graph based upon the fuel type/composition. In some cases, fuel cost, operational metrics such as temperature or air pressure, and other metrics are used as inputs in determining the power cost. Other parameters such as power sources requested to produce a minimum amount of power are also collected. In an embodiment, this information may include emissions and or maintenance schedule information about each of the power sources.

Locomotive controller 114 then checks to determine if the power provided to locomotive 112 is within a configuration specified tolerance of the power required to operate the locomotive. If the power required and power provided are out of tolerance, or one of the power cost parameters changed, locomotive controller 114 makes a power allocation between the power sources, dividing the locomotive power requirement between available power sources, such as, for example, locomotive engine-generator sets 116 and auxiliary power sources such as APU 50. In one embodiment, the power allocation is performed in a way to minimize the total cost of power utilized by the locomotive, using the power cost and minimum/maximum amounts of power produced for each power source as input. In some embodiments, the power cost is a graph that represents the varying power cost based upon the amount of power provided. Locomotive controller 114 finds the minimum total cost based upon the amount of power requested, and sets the primary power sources (e.g., sets generator excitement and RPMs) and sends requests to auxiliary power sources to provide the desired amount of power.

Power allocation algorithms may be very complex, and may include current location, anticipated power requirements, and other factors in the allocation algorithm.

In some embodiments, the power allocation may be simplified to use fuel costs as the allocation factor. For example, when the difference between diesel and natural gas fuel prices exceed a certain level, the lower priced fuel is always less expensive to operate. Similarly, if specific fuels are available, it may more efficient to operate with those fuels. The results of the power allocation process are stored in locomotive controller memory 146 for subsequent use.

Locomotive controller 114, having configured locomotive consist 110 to operate with a specific source and amounts of power then monitors the power provided by each power source to determine if the amount of power being provided is in accordance with the settings, and makes adjustments to the power source configurations as needed to keep the amount of power provided to the locomotive in line with the power requirements. The control loop then repeats on a periodic interval.

In applications where fuel assemblies 52 have direct control and fuel connections 148, 150 with locomotive 112, valves 120 of fuel handing system 210 (FIG. 6) fluidly connect pressure tank 60 to engines 78. Primary locomotive controller 114 may interrogate each fuel assembly 52, determine the type of fuel, its cost, and its energy density, and determine which of the available fuels it should use in the current situation based on the information received from fuel assemblies 52. After selecting the fuel to use, primary locomotive controller 114 can configure the engine operating parameters (idle, timing, etc.) so engines 78 process the selected fuel most efficiently. For example, it may be cost effective to use syngas or process gas while engines 78 are idling, and to use LPG when the engines 78 are running at maximum RPM. Similarly, primary locomotive controller 114 can use fuel cost and/or fuel energy density as inputs in determining which fuel should be used in the current situation.

Figure 5:
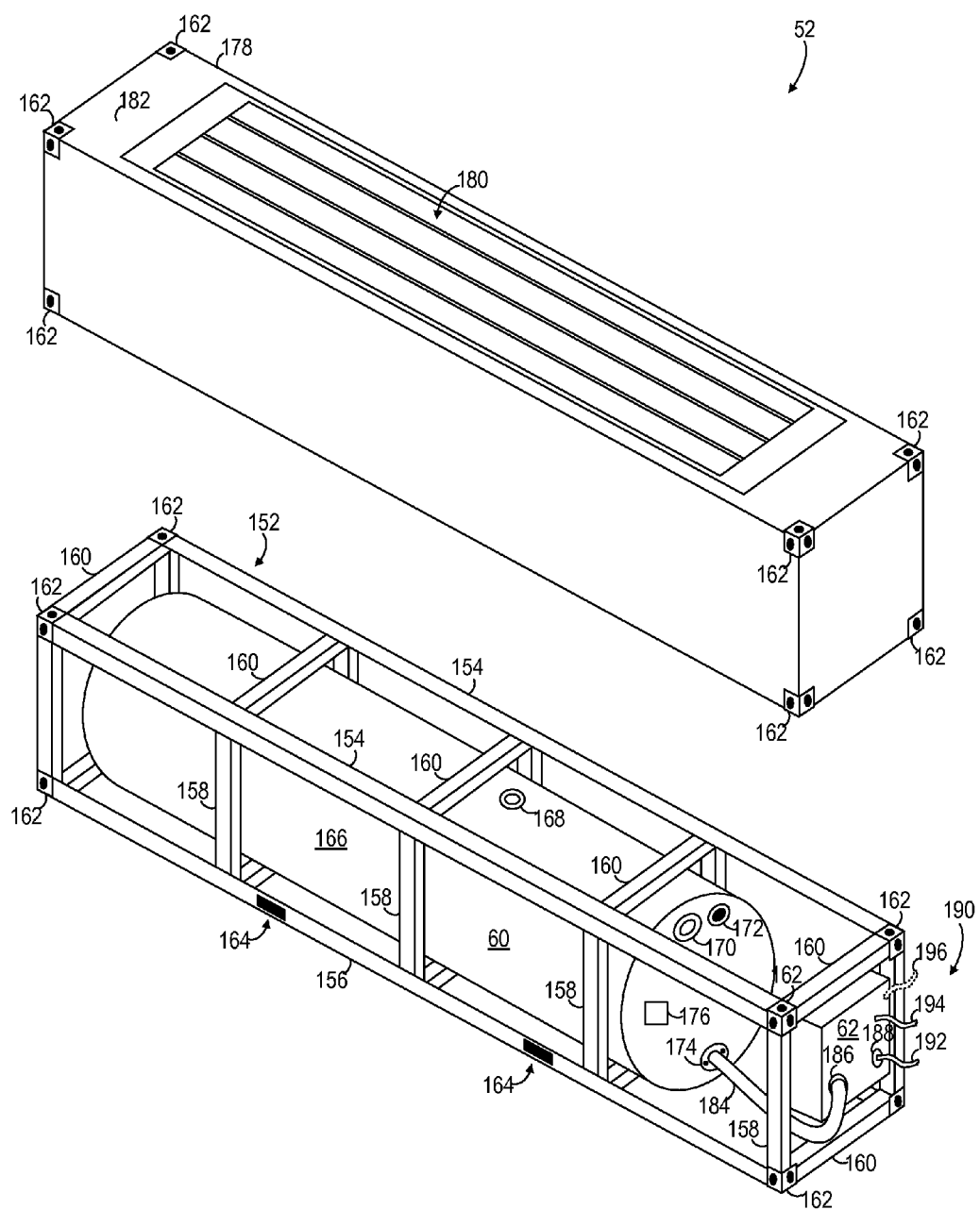
FIG. 5 is a schematic diagram of a gaseous fuel assembly, in accordance with an embodiment of the invention.

Referring now to FIG. 5, a fuel assembly 52 is illustrated in accordance with An embodiment of the invention. Fuel assembly 52 includes a frame 152 constructed from multiple top side support members 154 and bottom side support members 156 interconnected by vertical support members 158 and cross support members 160. Top side support members 154, bottom side support members 156, vertical support members 158, and cross support members 160 are constructed of any number of suitable support materials, such as, for example, structural steel. According to one embodiment, a number of tie-downs or fastening structures 162 are coupled to frame 152 to removably secure interchangeable gaseous fuel assembly 52 to an external support structure (not shown), such as, for example, a locomotive body or frame, a power unit, a rail car body, or another interchangeable gaseous fuel assembly. In one embodiment, fastening structures 162 are corner fittings or corner castings similar to those typically used in intermodal containers. Such corner fittings have lug receiving holes on the faces thereof for purposes of receiving lifting lugs. In some embodiments, fastening structures 162 are provided at alternative locations along the bottom side support members 156 of frame 152 at locations calculated to permit fuel assembly 52 to be lifted safely using standard overhead container lifting technologies. These lugs may be on rail yard-based lift equipment, such as overhead lift gantries, thus allowing for standardized equipment to be used to lift the interchangeable gaseous fuel assembly 52 for removal and replacement thereof. Similarly, multi-lugged pins may be used to interconnect the corner fittings 162 of fuel assembly 52 to other intermodal containers by engaging the corner fittings of respective containers to one another. Likewise, pins may be used on railroad locomotives and rail cars chassis to secure fuel assembly 52 in place in order to prevent tipping or upset, as well as for stacking or securing fuel assemblies 52 on road trucks or aboard ships. Openings between support members 154-28 provide access to the various inlets, outlets, valves, controls, and the like, on or associated with pressure tank 60.

According to another embodiment, a number of slots or openings 164 are formed in the bottom side support members 156 of frame 152. Openings 164 are sized to receive lifting fork arm, thereby allowing for lifting fork technologies to lift light-weight interchangeable gaseous fuel assemblies without the need for yard-based overhead lifting apparatus.

Gaseous fuel assembly 52 may be grounded via its frame 152 and/or the attaching lugs to an underlying auxiliary power unit, railcar body, or locomotive body in order to dissipate static charges that might ignite leaking gaseous fuel.

A pressure tank 60 is supported within frame 152 and is secured to frame 152 via fasteners (not shown) at multiple points. In one embodiment, pressure tank 60 rests on cross support members 160, and is in contact with at least some of side support members 154 and/or vertical support members 158. Frame 152 is designed such that a frame of a second interchangeable fuel assembly (not shown) may be stacked atop frame 152 of fuel assembly 52.

Pressure tank 60 is of suitable construction to store a gaseous fuel 166 at a temperature and pressure where the fuel 166 remains substantially gaseous in the stored state. As used herein, "gaseous fuel" means fuels in liquid or gaseous state (depending upon current temperature and pressure), where the fuel is normally in a gaseous state at standard temperature and pressure. In many cases, these fuels are hydrocarbons such as natural gas, propane, or syngas. Gaseous fuel may also be, for example, compressed or liquefied hydrogen, producer gas, methane, butane, and the like. Gaseous fuels are measured according to standards in volumetric units, typically cubic feet or cubic meters, at a specified temperature and pressure. In these volumetric units, each type of gaseous fuel stores differing amount of energy, based upon the mixture of gases or other components that it contains. The measure of this energy is the "energy coefficient" of the fuel. The mixture of gases can vary based upon the time of year, geographic location the fuel was obtained from, and other factors. Thus, for example, "natural gas" has a range of typical energy coefficients. Similarly, propane has a differing range of energy coefficients. In alternative embodiments, pressure tank 60 may store ethanol, diesel fuels, and the like.

According to various embodiments, pressure tank 60 is constructed of one of a pure metal, a metal composite material, and a composite material such as, for example, steel, aluminum, or carbon fiber. Pressure tank 60 may be single walled or double walled and may be insulated, according to various embodiments. In an exemplary embodiment, pressure tank 60 is designed for nominal operation at 3600 psi, in accordance with industry standards for gas storage and transportation vessels for compressed natural gas.

Pressure tank 60 may be fitted with one or more relief valves 168, fill valves 170, a vapor return inlet 172, and an outlet valve 174. In particular embodiments, ports (not shown) are added to pressure tank 60 in order to accommodate a sensor assembly 176 for measuring attributes of the fuel 166 within pressure tank 60. Sensor assembly 176 includes a number of probes and/or sensors electrically connected to a fuel assembly manager 62, as described in more detail with respect to FIG. 7. As used herein, the term "sensor" is used to refer to a device capable of producing outputs that can be correlated with one or more physical properties of at least a portion of its environment. Examples include, but are not limited to, temperature sensors, pressure sensors, current sensors, voltage sensors, and fuel flow rate sensors.

According to one embodiment, a cover 178 may be secured to the external surfaces of frame 152 in order to protect the pressure tank 60, manifolds, valves, and other components of fuel assembly 52 from weather and vandalism. Vents or louvers 180 may be formed in a top surface 182 of cover 178 to permit air circulation and to avoid the buildup of explosive fumes within fuel assembly 52. Advantageously, by situating vents/louvers 180 at the top surface 182 of fuel assembly 52, any gaseous fuel escaping due to a leak harmlessly dissipates away from locomotive 112 and/or locomotive consist 110 when fuel assembly 52 is mounted on top of a locomotive or rail car frame. Furthermore, locating fuel assembly 52 in this way minimizes the likelihood of damage in a derailment or by impact with track debris or yard traffic.

As shown in FIG. 5, first fuel hose 184 is connected to the outlet valve 174 to fluidly connect pressure tank 60 to fuel input 186 of a fuel assembly manager 62, which provides for control electronics for the electronic monitoring and reporting of tank ID, its contents, and the state of the contents, changing state and pressure of the gaseous fuel to meet common fuel requirements, as well as delivering a gaseous fuel from pressure tank 60 to a fuel outlet 188.

Fuel assembly 52 includes a system of electrical, control, and fuel interconnects 190 that are provided to couple fuel assembly 52 to a locomotive or railcar mounted auxiliary power unit. This system of interconnects 190 can be made using industry standard connectors and hoses (for the gaseous fuel) and industry standard power connectors for the control and electrical interconnects. In one embodiment, interconnects 190 include a second fuel hose 192, a common control connector 194, and an optional electrical power connection 196 (shown in phantom). Second fuel hose 192 is fluidly connected to fuel outlet 188 of fuel assembly manager 62. Common control connector 194 electrically connects fuel assembly manager 62 to one or more power and/or railroad locomotive control systems. Optional electrical power connection 196 (shown in phantom) is electrically connected to a external power source, such as an auxiliary power generator or a locomotive electrical power bus (not shown) to receive external power for powering components of fuel assembly manager 62, as described in more detail below.

Figure 6:
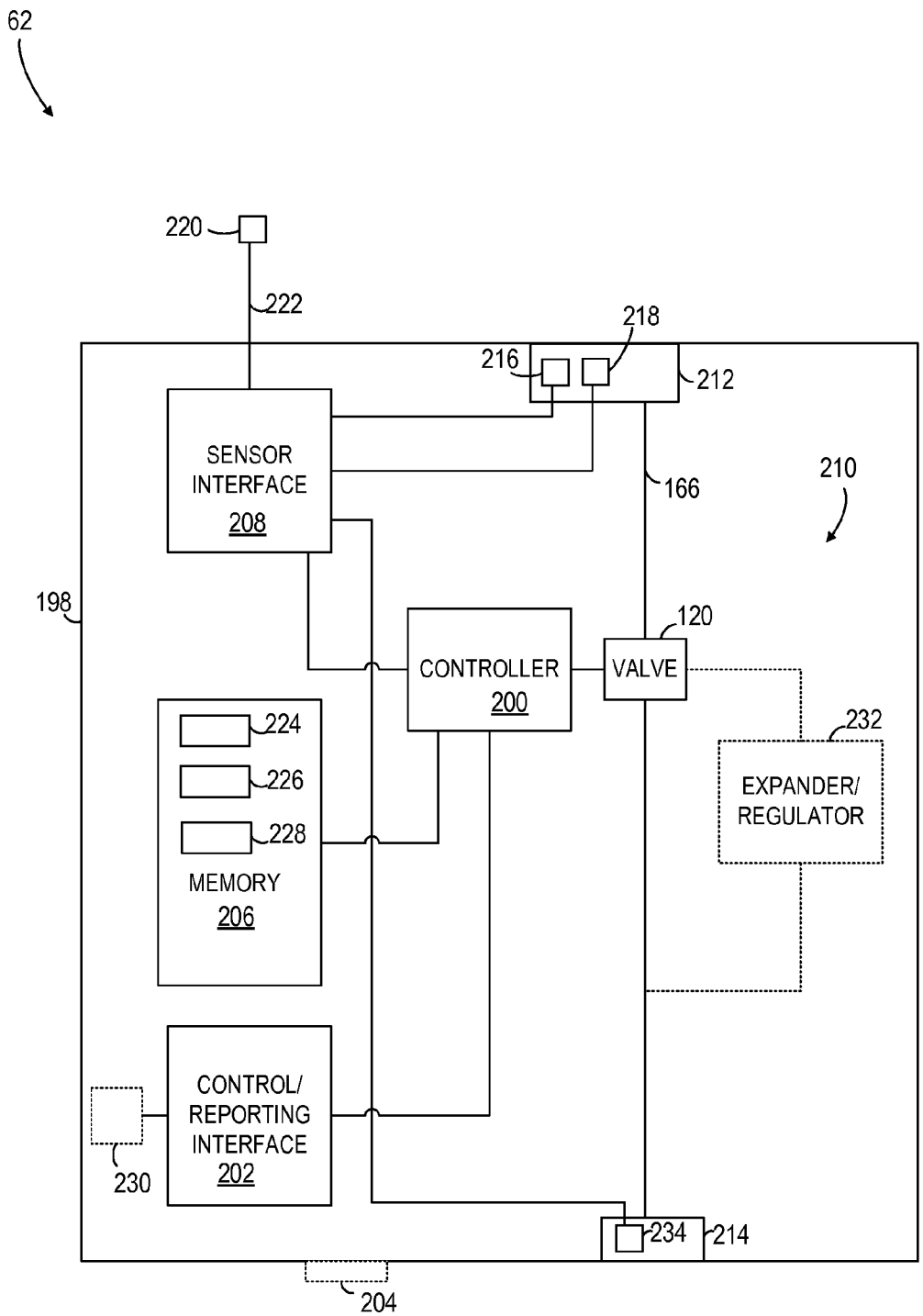
FIG. 6 is a schematic diagram of a fuel assembly manager for the gaseous fuel assembly of FIG. 5, in accordance with an embodiment of the invention.

FIG. 6 is a schematic diagram of fuel assembly manager 62 in accordance With an embodiment of the invention. Fuel assembly manager 62 includes a weather and vandal resistant housing 198 that houses a fuel assembly controller 200, a bi-directional control and reporting interface 202, an optional power interface 204 (shown in phantom), one or more memory modules 206, a sensor interface 208, and an electronically controllable fuel handing system 210 coupled between to a fuel input connection 212 and a fuel delivery interface 214.

According to one embodiment, fuel assembly controller 200 is a PLC or micro-controller, along with associated memories, that provides control electronics for the electronic monitoring and reporting of memory module 206 and fuel handing system 210. Fuel assembly controller 200 is electrically connected to memory modules 206, fuel handing system 210, and bi-directional control interface 202 as shown in FIG. 7. Fuel assembly controller 200 may receive operating power from any number of sources, including control and reporting interface 202, optional power interface 204, or other power source (not shown) such as an internal battery or generator powered by fuel flow.

Fuel assembly manager 62 is also electrically coupled to and provides control electronics for the electrical monitoring and reporting of data received by sensor interface 208. Sensor interface 208 communicates with a fuel pressure sensor 216 and a fuel temperature sensor 218 mounted within housing 198 of fuel assembly manager 62. In one embodiment, sensors 216, 218 are mounted within input fuel connection 212 of fuel assembly manager 62. Sensor interface 208 also communicates with one or more external sensor(s) 220 that are positioned external to fuel assembly manager 62 and mounted to pressure tank 60 (FIG. 6). External sensor 220 is electrically coupled to fuel assembly manager 62 using electrical connections 222. For each type of sensor 216, 218, 220 fuel assembly controller 200 reads measurements from sensors 216, 218, 220, optionally records them in memory module 206, reports them on the control and reporting interface 202, and/or takes control actions to manipulate the fuel handing system 210 in order to control the flow of fuel. Although only three sensor inputs 216, 218, 220 are shown for illustration, one skilled in the art will recognize that fuel assembly manager 62 may interface with any number and type of sensors as desired to monitor the contents of pressure tank 60, the operation of fuel assembly manager 62, and the delivery of fuel from fuel assembly 52. Using data acquired from sensor assembly and data stored on memory module 206, fuel assembly manager 62 can compute fuel tank full data, based on input parameters, such as, for example, temperature, pressure, and tank size.

According to various embodiments, memory module 206 comprises any number of non-volatile memories, either read-only or read-write, such as ROM or EEPROM, that are used to store information about the identity, capabilities, contents, and/or historical operations of fuel assembly 52, as described below.

In one embodiment, memory module 206 includes a first tank memory 224 that may include any of the following identifying information: an identifier for fuel assembly 52 to uniquely identify fuel assembly 52, information describing capacity of pressure tank 60, information describing construction of pressure tank 60, and information describing capabilities of interchangeable gaseous fuel assembly 52, such as, for example, temperature and pressure regulation capabilities. Additionally, first tank memory 224 may include identifying information regarding the history of interchangeable gaseous fuel assembly 52, including inspection history and use history.

Memory module 206 may also include a second tank memory 226 that stores identifying information about the fuel 166 currently stored in pressure tank 60 of the interchangeable gaseous fuel assembly 52. For example, second tank memory 226 may store identifying information about a current fuel type (e.g., CNG, LNG, butane), fuel energy density, date loaded/filled, fuel cost, and similar information related to the fuel 166 within pressure tank 60.

Memory module 206 may further include a third tank memory 228 that stores identifying information about the operational history of interchangeable gaseous fuel assembly 52, including historical sensor readings (e.g., temperature and pressure over time), fill/discharge rates, operation of the fuel control system, and similar history of operating information for fuel assembly 52.

As shown in FIG. 7, fuel assembly controller 200 is electrically connected to tank control and reporting interface 202. According to various embodiments, control and reporting interface 202 is configured to receive and transmit signals to and from fuel assembly controller 200 to an external controller via an electrical connection with the external controller and/or via the transmission of radio frequency signals. According to various embodiments, control and reporting interface 202 may be configured to interface with an external controller such as a primary locomotive controller, a controller coupled to an auxiliary power unit, and/or controllers integrated into trackside equipment, as examples. Control and reporting interface 202 may be connected to the external controller using physical connections, such as a CANbus connection or an established locomotive control system interface. The nature and type of control and reporting interface 202 may vary, as may the number of control interfaces interfaced with, without departing from the design. In one embodiment, control and reporting interface 202 is an RF interface that permits memory module 206 of fuel assembly manager 62 to be interrogated and optionally written to using RF-based technologies such as RFID. In such an embodiment, interface 202 is coupled to an optional RIFD transmitter 230 (shown in phantom). This enables trackside equipment, locomotive controllers, auxiliary power unit controllers, and the like to interrogate memory module 206, and to write updated information into the memory (such as new fuel type, energy density, and costs) to the memory without requiring a physical connection to fuel assembly controller 200. Fuel assembly controller 200 responds to requests received by control and reporting interface 202 from external controllers by configuring fuel handing system 210 to deliver fuel in a requested manner and/or reading or writing data to memory module 206.

Fuel assembly controller 200 is further connected to fuel handing system 210 of fuel assembly manager 62. According to one embodiment, fuel handing system 210 includes input fuel connection 212, an electronically controllable valve 120, an optional expander/regulator 232 (shown in phantom), fuel delivery sensors 234, and a common fuel delivery interface 214. Input fuel connection 212 provides the connection point for fuel hose 184 at fuel input 186 of fuel assembly manager 62. In one embodiment, input fuel connection 212 includes one or more industry standard connectors, as well as any desired safety devices such as fuel shutoff and flow management devices for operation of interchangeable gaseous fuel assembly 52. Input fuel connection 212 is fluidly connected to controllable valve 120, which is operated under the control of fuel assembly controller 200. Electronically controllable valve 120 may include one or more solenoid controlled valves that can be used to control the flow of fuel from pressure tank 60 to the common fuel delivery interface 214. In some embodiments, optional expander/regulator equipment 232 such as fuel expanders (e.g., LNG warmers) and regulators may be placed inline between controllable valve 120 and fuel delivery interface 214 to selectively heat and/or expand the fuel. Fuel assembly controller 200 is configured to regulate operation of electronically controllable valve 120 to control whether fuel is passed through expander/regulator equipment 232 before being routed to the common fuel delivery interface 214.

Fuel assembly manager 62 is configured to manage the delivery of fuel under relatively stable temperature and pressures, without regard to the state of the fuel in pressure tank 60. For example, if fuel assembly manager 62 receives a request to deliver fuel at two bar of pressure, and the fuel 166 within pressure tank 60 is liquid natural gas (LNG), fuel assembly controller 200 will cause fuel 166 to be warmed and expanded to gaseous state at two bar within fuel assembly manager 62, so that it may be delivered via the common fuel delivery interface 214 to the given power unit. The controller-managed capabilities of fuel assembly manager 62 permits the interchangeable gaseous fuel assembly 52 to seamlessly interoperate with various types of locomotive engines or power units and deliver fuel and provide fuel to these various types of units at various temperatures and pressures.

After the gaseous fuel is in a state for delivery, it is routed past one or more fuel delivery sensors 234 to the common fuel delivery interface 214. Fuel delivery sensors 234 read the delivery parameters of the fuel (such as temperature, pressure, and flow rates) and transmit these readings to fuel assembly controller 200 to be recorded. According to one embodiment, fuel delivery interface 214 is a GMV-09 receptacle. In one embodiment, fuel delivery sensor 234 measures a volume of fuel discharged from pressure tank 60.

Referring now to FIG. 7, in accordance with an alternative embodiment of the invention, fuel assembly 52 includes multiple pressure tanks 60 connected together to form a pressure tank assembly 236. As shown, pressure tanks 60 are connected to a common manifold 238 by way of respective valves 240, which control access of each tank 60 to manifold 238. Valves 240 may comprise any combination of manifold-specific flow management devices such as shutoff valves, check values, and pressure release valves, for example. External sensors 220 are coupled to respective pressure tanks 60 via control cables (not shown) similar to electrical connections 222 (FIG. 6) to monitor operating characteristics of each tank 60, as explained in detail above. External sensors 220 and valves 240 are electrically coupled to fuel assembly controller 200 (FIG. 6) of fuel assembly manager 62 to control operations of and interactions between pressure tanks 60. In embodiments where fuel assembly 52 includes multiple pressure tanks 60, memory module 206 of fuel assembly manager 62 stores unique identifying information for each pressure tank 60 within pressure tank assembly 236.

According to various embodiments, fuel assembly 52 is constructed to conform to a common size advantageous for transport throughout the locomotive industry. In addition to enabling the interchange of the gaseous fuel assemblies, manufacturing interchangeable gaseous fuel assemblies in common sizes provide advantages in the transport of the fuel assemblies when they are not mounted on a locomotive or railcar. In one embodiment, fuel assembly 52 is sized to correspond to the size of an intermodal container. As used herein, the term "intermodal container" refers to a container specifically designed for transport by rail, road truck, and ship with standardized sizing and features for accommodating use in each such mode of transportation. Particularly advantageous are sizes that correspond to the smaller intermodal container sizes, such as, for example, a container having a length of approximately 10 feet, 20 feet, 30 feet, or 40 feet, a height of approximately four foot six inches, eight feet six inches, or nine feet six inches, and a width of approximately eight feet, although one skilled in the art will recognize that other sizes may be suitable depending upon the particular embodiment. According to an exemplary embodiment, frame 152 of fuel assembly 52 is sized to correspond to an intermodal container having a length of 20 feet, a height of eight feet six inches, and a width of eight feet.

Fuel assembly 52 delivers several important advantages when used in railroad operations. First, fuel assembly 52 enables rapid refueling of railroad power generation equipment without the use of expensive yard-based lift equipment. Second, fuel assembly 52 enables the use of various types of gaseous fuels, depending upon what fuels are locally available. Third, fuel assembly 52 interfaces with power generation and locomotive power control systems to enable these systems to optimize or at least improve their use and cost of power.

Figure 8:
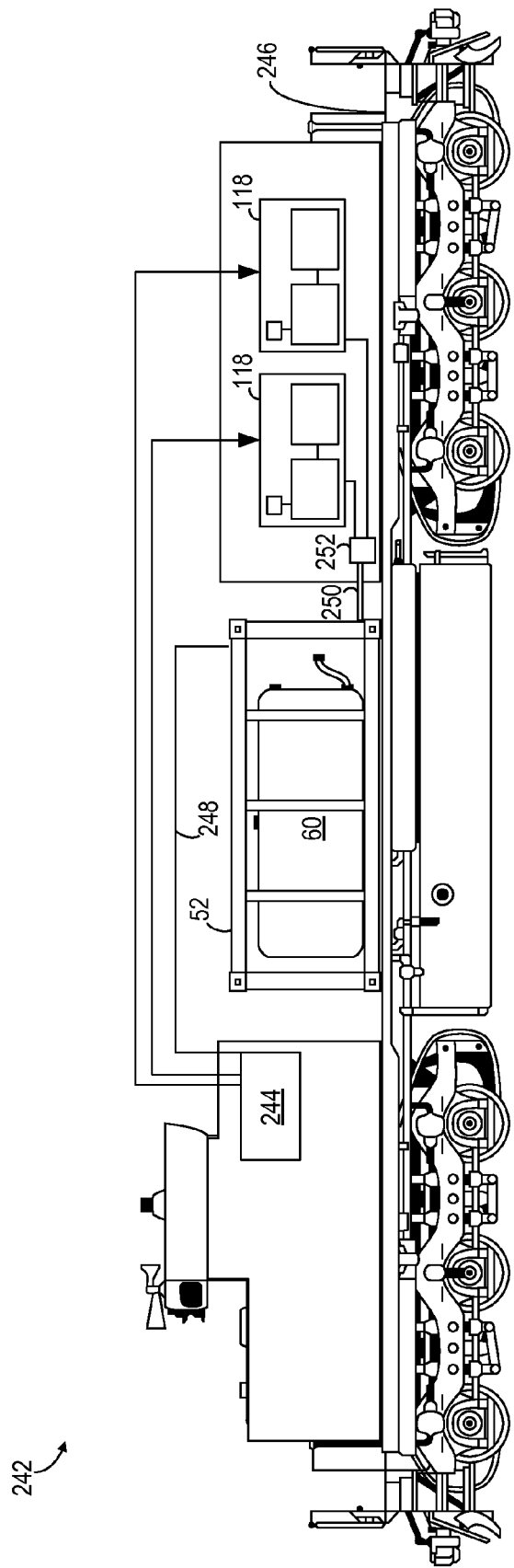
FIG. 8 is a schematic diagram of a gaseous genset locomotive incorporating the gaseous fuel assembly of FIG. 5, in accordance with an embodiment of the invention.

Referring now to FIG. 8, a gaseous fuel locomotive 242 is illustrated that incorporates fuel assembly 52 of FIG. 5. While fuel assembly 52 is illustrated in FIG. 8 as including a single pressure tank 60, one skilled in the art will recognize that fuel assembly 52 may alternatively be configured with a multiple pressure tank assembly 236, as described with respect to FIG. 6. Gaseous fuel locomotive 242 includes one or more genset engines 118 configured to burn gaseous fuels and a control system 244 that controls the operation of the genset engines 118. Gaseous fuel locomotive 242 may be designed for line haul or switching use, according to various embodiments.

Interchangeable gaseous fuel assembly 52 is fastened to the locomotive frame 246 using connecting pins (not shown) fastened to corner fittings 164 (FIG. 5) on fuel assembly 52 and to corresponding fittings (not shown) on locomotive frame 246. These pin/fitting combinations permit operations workers to removably secure gaseous fuel assembly 52 to a locomotive frame 246. The pin assembly also provides a grounded connection between gaseous fuel assembly 52 and locomotive frame 246.

Gaseous fuel assembly 52 is further connected to locomotive 242 using a control interconnection cable 248, which electrically connects fuel assembly manager 62 of fuel assembly 52 to the locomotive's control system 244. The control system 244 has been configured or adapted to recognize and manage gaseous fuel assembly 52. Specifically, the control system 244 is configured to recognize one or more of: (a) that a gaseous fuel assembly 52 is present, (b) the type of fuel gaseous fuel assembly 52, (c) the energy density of the fuel within gaseous fuel assembly 52, and (d) the cost of the fuel in gaseous fuel assembly 52, as described in more detail below.

Gaseous fuel assembly 52 is further connected to locomotive 242 using a removable gaseous fuel line 250 that mates with fuel delivery interface 214 of fuel assembly 52 and with a similar fuel interface 252 on gaseous fuel locomotive 242. As shown, fuel interface 252 is fluidly connected to genset engines 118 on gaseous fuel locomotive 242.

According to one embodiment, gaseous fuel assembly 52 receives auxiliary power from an auxiliary power bus (not shown) of gaseous fuel locomotive 242. The auxiliary power received from auxiliary power bus may be used to power expander/regulator 232 of fuel assembly manager 62 in order to convert a fuel within pressure tank 60 such as, for example, LNG to a desired gaseous state for delivery to locomotive 242.

Although only one interchangeable gaseous fuel assembly 52 is shown in FIG. 8, a locomotive configured or adapted for use with interchangeable gaseous fuel assemblies may utilize more than one interchangeable gaseous fuel assembly 52 to extend the operating range of the gaseous fuel locomotive 242. One benefit of the interchangeable gaseous fuel assemblies 52 is that they allow a locomotive to use fuels with differing storage requirements (e.g., LNG vs. CNG) without any adaptation of the locomotive itself. Thus, interchangeable gaseous fuel assemblies 52 allow the use of common designed gaseous fuel locomotives that can use whatever gaseous fuel best meets the required energy density and capacities for the operating conditions. The same fuel structure can be used for CNG and the more energy-dense LNG. Alternatively, the locomotive can operate on whatever gaseous fuel is available, such as syngas or process gases, by simply changing the interchangeable gaseous fuel assembly 52.

In addition to enabling locomotive 242 to operate on whatever gaseous fuel best fits current operational parameters, the use of fuel assembly mounted on locomotive frame 246 provides significant operational advantages. For example, the interchangeability of gaseous fuel assembly permits fast servicing and refueling of locomotive 242. Traditional gaseous fuel tanks require very long recharge times (on the order of eight hours) to completely recharge when coupled to an economically selected compression unit. Alternatively, to rapidly fill from pre-stored compressed gas tanks requires a considerably larger volume of tanks in the refilling system and/or higher pressures for those tanks Gaseous fuel assembly, on the other hand, may be swapped with another gaseous fuel assembly in a much shorter time frame (e.g., less than fifteen minutes) than the typical times associated with high pressure diesel refueling.

In addition, gaseous fuel assembly 52 can be changed trackside without overhead rail yard-based equipment such as lift gantries, which can lift containers with weights up to approximately 40,000 pounds. Gaseous fuel assembly 52 is also constructed to be below a maximum weight capacity of a truck-mounted crane or forklift to permit trackside interchange of gaseous fuel assembly 52. Depending upon the specific truck-mounted crane, the lifting capacity is limited to appropriately 10,000 or 20,000 pounds in one embodiment. These operational features of gaseous fuel assembly 52 support the railroad industry's "just in time" fueling initiatives, where fuel meets the train during crew changes instead of the train refueling at fixed stops.

In operation, control system 244 of gaseous fuel locomotive 242 communicates with fuel assembly manager 62 of fuel assembly 52 to determine identifying information for fuel assembly 52. Based on the received identifying information, control system 244 may, for example, identify a type of fuel within fuel assembly 52 and transmit control commands to fuel assembly manager 62 to deliver fuel to locomotive 242 at a desired pressure and/or temperature. Control system 244 of gaseous fuel locomotive 242 may be further configured to selectively adjust command signals sent to genset engines 118 based on the identified type of fuel.

As set forth above, the improved locomotive controller and the alternative power and fuel systems described herein permit the locomotive operator to manage their power production to a specific cost by blending power from multiple power sources using a variety of fuels.

A technical contribution for the disclosed method and apparatus is that it provides for a computer implemented control of fuel tank assembly.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

Therefore, according to one embodiment of the invention, a fuel assembly for a train engine includes a frame, a first fuel storage tank sized to fit within the frame and configured to store one of a liquid and a gaseous fuel, and a fuel control assembly configured to regulate delivery of the gaseous fuel to an external power unit. The fuel control assembly includes a first fuel assembly memory module having stored thereon identifying information of the interchangeable fuel assembly.

According to another embodiment of the invention, a rail car assembly includes a power unit configured to supply an auxiliary power to a locomotive and an interchangeable fuel assembly coupled to the power unit. The interchangeable fuel assembly includes a support frame, a storage tank disposed within the frame, the storage tank having fuel contained therein, and an electronic control system configured to monitor operating characteristics of a fuel stored within the storage tank. The electronic control system includes an electronic memory module having stored thereon identifying information for the interchangeable fuel assembly.

According to yet another embodiment of the invention, a method of providing fuel for a locomotive assembly includes providing a first interchangeable fuel assembly. The first interchangeable fuel assembly includes a first fuel tank disposed within a frame, the first fuel tank constructed to store a first gaseous fuel and a first fuel control system that includes a first memory module having stored thereon identifying information for the first fuel tank. The identifying information includes at least one of a fuel type and a fuel cost of the first gaseous fuel. The method also includes fluidly coupling the first interchangeable fuel assembly to a power unit and relaying the identifying information for the first gaseous fuel tank to the power unit.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments.

Accordingly, the invention is not to be seen as limited by the foregoing description. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel assembly for a train engine comprising:
a frame;
a first fuel storage tank sized to fit within the frame and configured to store a gaseous fuel; and
a fuel control assembly configured to regulate delivery of the gaseous fuel to an external power unit, the fuel control assembly comprising a fuel assembly memory module having stored thereon identifying information of the fuel assembly, the identifying information comprising at least one of a type of the gaseous fuel, a cost of the gaseous fuel, an energy density of the gaseous fuel, a unique identifier for the fuel assembly, and historical data of the fuel assembly.

2. The fuel assembly of claim 1 wherein the identifying information further comprises at least one of a construction of the first fuel storage tank, a date the fuel assembly was filled with the gaseous fuel, operational capabilities of the fuel assembly, and a capacity of the first fuel storage tank.

3. The fuel assembly of claim 1 wherein the historical data of the fuel assembly comprises at least one of an operational history of the fuel assembly, a use history of the fuel assembly, and an inspection history of the fuel assembly.

4. The fuel assembly of claim 1 wherein the fuel assembly memory module further comprises a computer writeable memory.

5. The fuel assembly of claim 1 wherein the fuel assembly memory module further comprises an RFID transmitter.

6. The fuel assembly of claim 1 further comprising a tank sensor coupled to the first fuel storage tank, the tank sensor configured to monitor at least one of a pressure, temperature, and volume of the gaseous fuel within the first fuel storage tank.

7. The fuel assembly of claim 1 further comprising a fuel meter configured to monitor a volume of gaseous fuel discharged from the first fuel storage tank.

8. The fuel assembly of claim 1 wherein the frame comprises a plurality of support members for lifting the first fuel storage tank with a lifting device to allow placement on one of a rail car and a locomotive frame.

9. The fuel assembly of claim 8 wherein the plurality of support members have slots formed therein sized to receive forks of a forklift.

10. The fuel assembly of claim 1 further comprising a fuel regulator coupled to the output of the first fuel storage tank, and
wherein the fuel control assembly is further configured to selectively operate the fuel regulator to modify at least one of a temperature and a pressure of the fuel.

11. The fuel assembly of claim 1 further comprising:
a manifold fluidly coupled to the first fuel storage tank via a first valve; and
a second fuel storage tank sized to fit within the frame, the second fuel storage tank fluidly coupled to the manifold via a second valve.

12. The fuel assembly of claim 11 wherein the fuel control assembly is further configured to operate the first and second valves to control delivery of fuel from the first and second tanks to the manifold.

13. The fuel assembly of claim 1 further comprising:
a control connecter electronically coupleable between the fuel control assembly and a primary locomotive control system; and
a fuel line coupleable between the fuel control assembly and a fuel interface of a locomotive.

14. A rail car assembly comprising:
a power unit configured to supply an auxiliary power to a locomotive; and
an interchangeable fuel assembly coupled to the power unit, the interchangeable fuel assembly comprising:
a support frame;
a storage tank disposed within the frame, the storage tank having fuel contained therein; and
an electronic control system configured to monitor operating characteristics of the fuel stored within the storage tank, the electronic control system comprising an electronic memory module having stored thereon identifying information for the interchangeable fuel assembly, the identifying information comprising at least one of a type of the fuel, a cost of the fuel, an energy density of the fuel, a unique identifier for the fuel assembly, and historical data of the fuel assembly.

15. The rail car assembly of claim 14 wherein the historical data of the fuel assembly comprises at least one of an operational history of the interchangeable fuel assembly, a use history of the interchangeable fuel assembly, and an inspection history of the interchangeable fuel assembly.

16. The rail car assembly of claim 14 wherein the electronic memory module further has stored thereon information identifying at least one of a construction of the storage tank, a date the interchangeable fuel assembly was filled with the fuel, operational capabilities of the interchangeable fuel assembly, and a capacity of the storage tank.

17. The rail car assembly of claim 14 wherein the power unit further comprises a control system programmed to:
receive the identifying information from the electronic control system of the interchangeable fuel assembly, the identifying information comprising a type of the fuel stored within the storage tank; and
selectively control operation of the power unit based on the type of fuel stored within the storage tank.

18. The rail car assembly of claim 14 wherein the support frame of the interchangeable fuel assembly is coupled to a top surface of the power unit.

19. The rail car assembly of claim 14 wherein the power unit comprises one of a diesel engine-generator set of the locomotive and an auxiliary power unit located in a tender car.

20. A method of providing fuel for a locomotive assembly, comprising:
providing a first interchangeable fuel assembly comprising:
a first fuel tank disposed within a frame, the first fuel tank constructed to store a first gaseous fuel; and
a first fuel control system comprising a first memory module having stored thereon identifying information for the first fuel tank, the identifying information comprising at least one of a fuel type and a fuel cost of the first gaseous fuel;
fluidly coupling the first interchangeable fuel assembly to a power unit; and
relaying the identifying information for the first fuel tank to the power unit.

21. The method of claim 20 further comprising selectively controlling operation of the power unit based on the fuel type of the first gaseous fuel.

22. The method of claim 20 further comprising:
removing the first interchangeable fuel assembly;
replacing the first interchangeable fuel assembly with a second interchangeable fuel assembly comprising:
a second fuel tank disposed within a frame, the second fuel tank constructed to store a second gaseous fuel; and
a second fuel control system comprising a second memory module configured to store identifying information for the second fuel tank, the identifying information comprising at least one of a fuel type and a fuel cost of the second gaseous fuel;
fluidly coupling the second interchangeable fuel assembly to the power unit; and
relaying the identifying information for the second fuel tank to the power unit.

23. The method of claim 20 further comprising selectively controlling the power unit based on the identified fuel type of the second gaseous fuel.

* * * * *

UNITED STATES PATENT AND TRADEMARK OFFICE
CERTIFICATE OF CORRECTION

| | | |
|---|---|---|
| PATENT NO. | : 8,855,839 B2 | Page 1 of 1 |
| APPLICATION NO. | : 13/839615 | |
| DATED | : October 7, 2014 | |
| INVENTOR(S) | : Frazier et al. | |

It is certified that error appears in the above-identified patent and that said Letters Patent is hereby corrected as shown below:

In the Specification

Col. 3, line 14, delete "a frac-" and
   substitute therefore -- a trac- --; and Col. 3, line 19, delete "fraction bus." and
   substitute therefore -- traction bus. --.

Col. 6, line 17, delete "locomotive tanks" and
   substitute therefore -- locomotive tanks. --.

Col. 14, line 5, delete "remaining)" and
   substitute therefore -- remaining. --; and Col. 14, line 27, delete "content)," and
   substitute therefore -- content, --.

Col. 20, line 60, delete "fraction bus." and
   substitute therefore -- traction bus. --.

Col. 30, line 23, delete "accordance With" and
   substitute therefore -- accordance with --.

Col. 31, line 59, delete "RIFD" and
   substitute therefore -- RFID --.

Signed and Sealed this
Seventeenth Day of March, 2015

Michelle K. Lee
*Director of the United States Patent and Trademark Office*